United States Patent [19]
Beeson et al.

[11] Patent Number: 5,696,865
[45] Date of Patent: Dec. 9, 1997

[54] OPTICAL WAVEGUIDE HAVING TWO OR MORE REFRACTIVE INDICES AND METHOD OF MANUFACTURING SAME

[75] Inventors: Karl W. Beeson, Princeton; Scott M. Zimmerman, Basking Ridge; Paul M. Ferm, Morristown, all of N.J.

[73] Assignee: AlliedSignal Inc., Morris Township, N.J.

[21] Appl. No.: 713,978

[22] Filed: Sep. 13, 1996

Related U.S. Application Data

[63] Continuation of Ser. No. 390,603, Feb. 17, 1995, abandoned.

[51] Int. Cl.$^6$ .............................. G02B 6/00; G03G 5/00
[52] U.S. Cl. .............................. 385/146; 385/43; 385/147; 385/901; 385/124; 385/143; 385/145; 430/127; 430/130
[58] Field of Search ............................ 385/43, 39, 27, 385/114, 115, 116, 120, 121, 146, 147, 901; 264/1.1, 1.24, 1.7; 430/56, 57, 127, 130, 133, 137

[56] References Cited

U.S. PATENT DOCUMENTS

| | | | |
|---|---|---|---|
| 3,187,627 | 6/1965 | Kapany | 385/116 X |
| 3,612,648 | 10/1971 | Malifaud | 385/116 X |
| 3,913,872 | 10/1975 | Weber | 385/121 X |
| 4,076,378 | 2/1978 | Cole | 385/43 X |
| 4,240,692 | 12/1980 | Winston | 385/43 X |
| 4,501,468 | 2/1985 | Borrelli et al. | 385/116 X |
| 4,761,062 | 8/1988 | Loce et al. | 385/116 X |
| 4,946,239 | 8/1990 | Garmon | 385/43 X |
| 5,192,863 | 3/1993 | Kavehrad et al. | 385/43 X |
| 5,371,826 | 12/1994 | Friedman | 385/115 |
| 5,462,700 | 10/1995 | Beeson et al. | 264/1.27 |
| 5,481,385 | 1/1996 | Zimmerman et al. | 359/40 |

OTHER PUBLICATIONS

Kurokawa, et al., "Fiber Optic Sheet Formation by Selective Photopolymerization", Applied Optics, vol.17, No. 4, Feb. 15, 1978, pp. 646–650.

*Primary Examiner*—Brian Healy
*Attorney, Agent, or Firm*—Verne E. Kreger, Jr.

[57] ABSTRACT

An optical tapered waveguide for use as a single device or in optical arrays is described. The optical waveguide contains at least one inclusive structure. The inclusion may possess an abrupt refractive index interface within the body of the tapered optical waveguide or it may consist of a graded refractive index region within the tapered optical waveguide. Light travels through the entire waveguide structure via total internal reflection. The inclusion provides for a more uniform light distribution output and increases the definition of the image plane by altering the direction of the light rays passing through the waveguide.

44 Claims, 17 Drawing Sheets

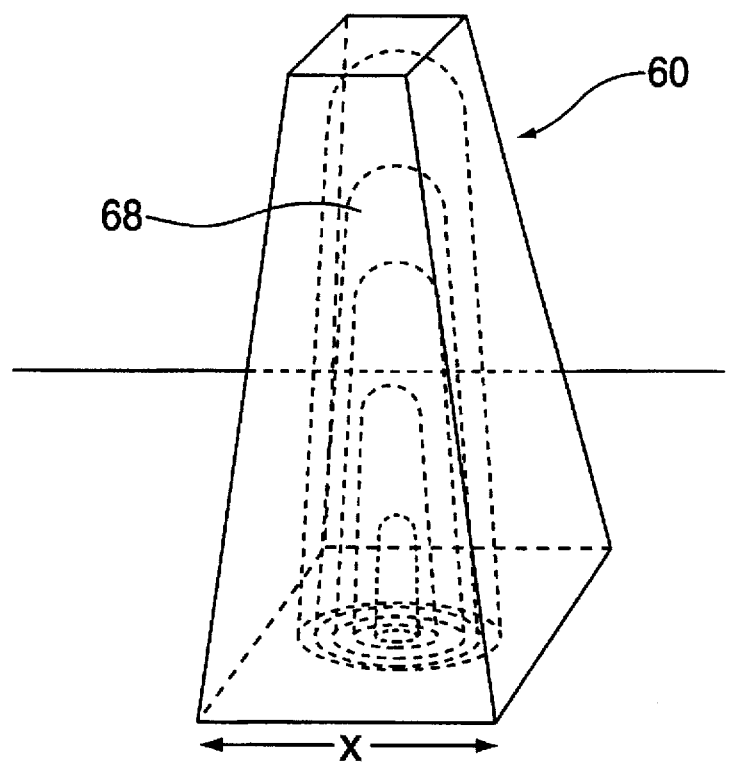
FIG. 3
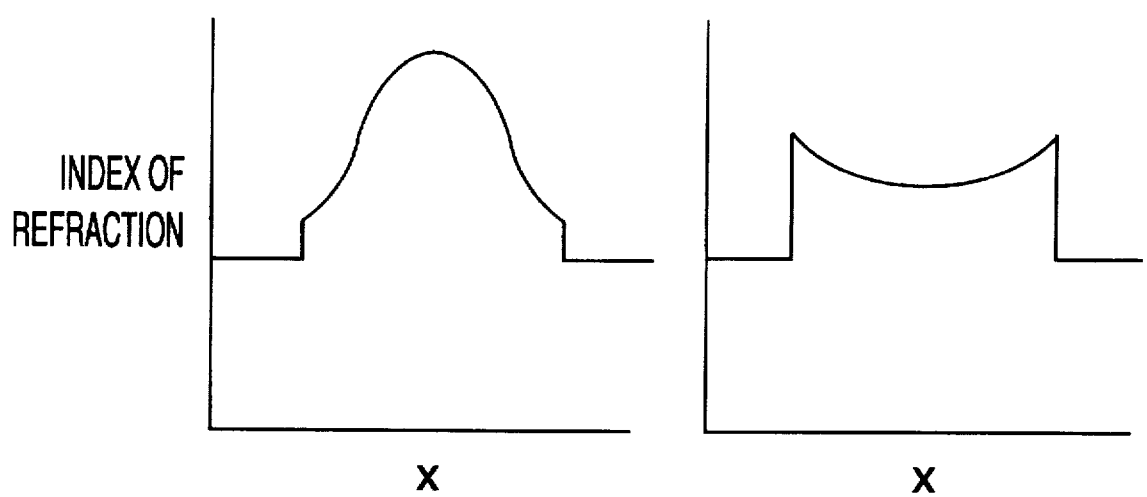
FIG. 3a
FIG. 3b

OPTICAL WAVEGUIDE HAVING TWO OR MORE REFRACTIVE INDICES AND METHOD OF MANUFACTURING SAME

This application is a continuation of application Ser. No. 08/390,603 filed Feb. 17, 1995, now abandoned.

BACKGROUND OF THE INVENTION

1. Field of the Invention

The present invention relates to an optical waveguide for transmitting light, and more particularly to an optical waveguide for use in an array for transforming the distribution of light passing through it to achieve high light transmission, high contrast and wide viewing angles. Such optical waveguides have widespread utility in applications such as lighting and information display systems.

2. Description of Related Art

There exist various types of optical elements which are useful to provide optical arrays, comprised of several of such optical elements grouped together. Such an optical array is capable of transforming the distribution of light which passes through it, to provide a more useful distribution for applications such as lighting, image formation, information display, image recording and the like.

A tapered optical waveguide, as shown in FIG. 1a, is described in U.S. application Ser. No. 08/086,414 now U.S. Pat. No. 5,481,385 assigned to the same assignees as the present invention and incorporated by reference herein. These tapered waveguides transmit light by TIR at the boundaries between the high refractive index waveguides and a low refractive index cladding material. The angular output distribution of light which has passed through the waveguides is controlled by the geometry of the tapered waveguide, such as its height, sidewall angle and relative area of its input and output surfaces. By varying these parameters it is possible to adjust the relative proportion of light rays which undergo one or more TIR reflections from the waveguide sidewalls and this will in turn control the angular output characteristics of light from the element or an array of such elements. Thus, light distribution will differ between tapered optical waveguides of differing geometry even though the refractive index difference at the waveguide boundaries are the same. The transformation of light direction by such a tapered optical waveguide element is shown in FIG. 1b. For this example, collimated light rays are shown to enter the input surface 42 of a tapered optical waveguide 40. Some of the rays undergo one or more reflections from the sidewalls 44 of such a tapered waveguide and exit the output surface 46 with some degree of angular divergence. By adjusting the optical element geometry it is possible to adjust the number of rays so affected and thus change the output angular distribution characteristics.

U.S. Pat. No. 5,481,385 teaches the utility of an array of such tapered optical waveguide elements when utilized as a viewing screen for improving the optical viewing characteristics of a liquid crystal display (LCD) device. U.S. Pat. Nos. 3,218,924 and 3,279,314, both to Miller, similarly teach the use of tapered optical element arrays to serve as viewing screens for rear projection displays. In some instances Miller teaches that a metal coating on the tapered elements can serve as a mirror to contain the light rather than using TIR as in U.S. Pat. No. 5,481,385.

U.S. Pat. No. 5,462,700 assigned to the same assignees as the present invention and incorporated by references herein, further teaches a convenient method to produce the tapered optical waveguides via a lithographic method. This method relies on accurate and low cost lithographic manufacturing techniques which can provide for numerous, small optical waveguides useful for high resolution array applications while maintaining low manufacturing cost. An important feature of an array of tapered optical waveguides is the small percentage of the output surface which is comprised of the output surfaces of individual waveguides. For this reason, it is possible and convenient to fill the interstitial regions between adjacent waveguides with light absorbing material for ambient light suppression and good viewing contrast.

While arrays of tapered optical waveguides offer distinct advantages over arrays of optical elements such as lenses, GRIN lenses and optical fibers for a number of optical applications, they still possess several optical characteristics which limit the optical performance of the elements or arrays comprised of such elements. Two serious problems remain in arrays of tapered optical waveguides. First, a certain portion of light rays will pass through the element of an array of such elements without undergoing any TIR reflections from the waveguide sidewalls. This can be seen by inspection of FIG. 1b. When arrays of such elements are utilized in optical applications such as viewing screens, that portion of unaffected rays may result in an unwanted characteristic called "see-through" or "bleed-through", wherein the viewer's eye can focus to a point behind the screen, resulting in viewing of non-uniformities caused by internal elements in a display apparatus. It is highly desirable that the eye of the viewer should focus only on the viewing screen itself, that is, the viewing screen should define the image plane in such an application. Secondly, for applications where collimated or near collimated light is passed through a tapered optical waveguide, the resulting output light will tend to cluster around discrete angles related to the number of reflections the various light rays make from the waveguide sidewalls. Thus, clusters of rays will exit at, or near, the angles associated with 0,1,2 or more reflections. Viewing screens and other optical arrays which are utilized in applications which favor collimated light will also display the same type of behavior, that is, certain light distribution angles will be well populated with light rays and others will not. This effect can be seen in the examples of U.S. Pat. No. 5,481,385 and is also described in U.S. Pat. No. 3,279,314. U.S. Pat. No. 3,279,314 teaches that this property is deleterious to the viewing characteristics of the array as it results in areas of high brightness, called "hotspots" and areas of low brightness and lowered contrast within the viewing plane. Miller has suggested that roughening the tips of the individual tapered elements will cause additional scatter to reduce this problem. However, introducing scattering into such an element or array of elements will result in additional unwanted loss of light and will increase backscatter of ambient light, thus decreasing the apparent image contrast to the viewer. For these reasons tapered optical elements with roughened tips are not considered a sufficient improvement in the art of optical elements for array applications.

Thus, it is clear that a need remains for an improved optical element for use in array applications which overcomes the problems and shortcomings in performance associated with optical elements of the prior art. In particular, a new type of optical element which allows for variable control of output light angular characteristics, which can be manufactured in large arrays with high resolution at low cost and which overcomes the problem of "see-through" and the problem of "hot spots" and regions of insufficient brightness when used with collimated lightsources is needed. Of particular need in applications that require direct viewing of the array surface is an improved optical element which overcomes the above listed problems while still providing the ability to add large areas of light absorbing material to the array surface without significant reduction of transmission area.

SUMMARY OF THE INVENTION

A new type of optical waveguide for use in optical arrays is described. Waveguides, also known in the art as light transmissive devices or lightguides, are used in display devices, such as for example projection display devices, off screen display devices, and direct view displays. See for example U.S. Pat. Nos. 3,218,924 and 3,279,314 to Miller and U.S. Pat. No. 4,767,186 to Bradley, Jr. et al. Such displays are used in a wide range of applications including computer terminals, airplane cockpit displays, automotive instrument panels, televisions, and other devices that provide text, graphics, or video information. This new type of optical waveguide is a compound structure consisting of a tapered optical waveguide which contains at least one inclusive structure. The inclusion may possess an abrupt refractive index interface within the body of the tapered optical waveguide or it may consist of a graded refractive index region within the tapered optical waveguide. This new element is given the designation of an index inclusion tapered optical waveguide (IITOW).

Specifically, the optical waveguide of the present invention differs from the prior art in that it propagates light rays via total internal reflection from the sidewalls of a tapered optical waveguide, but the refractive index of the body of the waveguide is not a constant value. Rather, the optical waveguide has a refractive index which is compound in nature. The compound refractive index may comprise either an inclusion of smaller volume than that of the tapered waveguide, with a refractive index which differs from that of the remainder of the waveguide or may comprise a region of graded refractive index within the tapered waveguide.

BRIEF DESCRIPTION OF THE DRAWINGS

FIG. 3 is an alternate embodiment of the present invention;

FIG. 3a and FIG. 3b are graphical representations of possible variations of the index of refraction within a waveguide;

FIG. 8 is combination with a cover plate;

DETAILED DESCRIPTION OF THE PREFERRED EMBODIMENTS OF THE INVENTION

The preferred embodiments of this invention will be better understood by those of skill in the art by reference to the above Figures. The preferred embodiments of this invention illustrated in the Figures are not intended to be exhaustive or to limit the invention to the precise form disclosed. The Figures are chosen to describe or to best explain the principles of the invention, and its application and practical use to thereby enable others skilled in the art to best utilize the invention.

Figure 2:
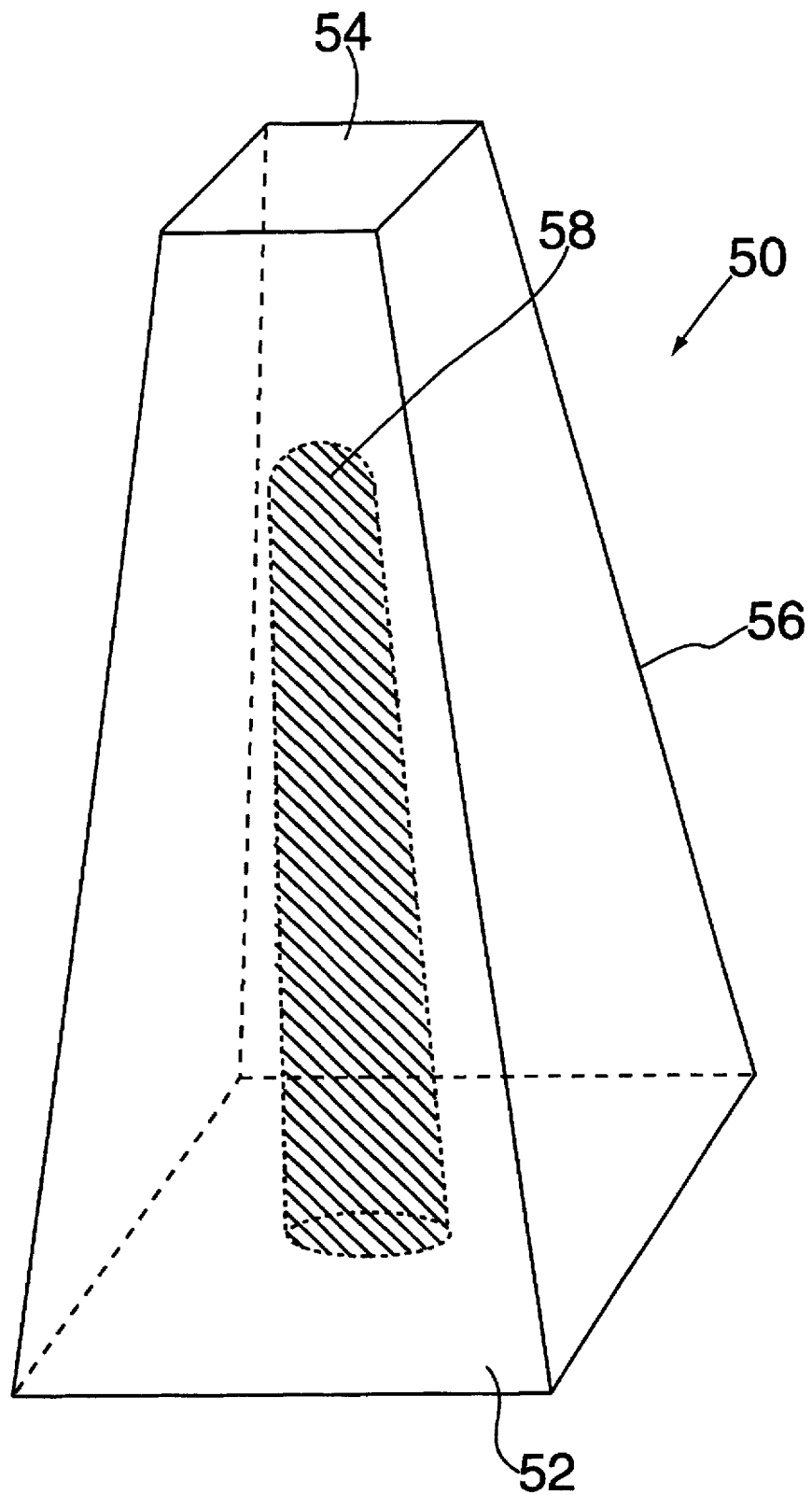
FIG. 2 is a tapered waveguide of the present invention comprising an inclusion.

FIG. 2 illustrates an optical waveguide 50 having a light input surface 52 and a light output surface 54 wherein the area of the light input surface is greater than the area of the light output surface. Optical waveguide 50 is also characterized as having an index of refraction $n_1$. In order that the tapered optical waveguide may transmit light via total internal reflection (TIR.), the sidewalls 56 of waveguide 50 must be surrounded by a medium of lower refractive index $n_0$. Optical waveguide 50 further comprises a solid inclusion 58 characterized as having an index of refraction $n_2$. Both inclusion 58 and optical waveguide 50 are composed of optically transparent material, but the refractive indices of the two regions are not equal. $N_2$ may be either less than, or greater than $n_1$. The difference between $n_1$ and $n_2$ should be greater than 0.001, preferably greater than 0.005 and most preferably greater than 0.01.

Optical waveguide 50 and inclusion 58 may be formed from any optically transparent materials including glass, quartz, clear plastic materials including, but not limited to, poly(methyl methacrylate), poly(styrene), poly(carbonate) and poly(ethylene terephthalate) or from a polymer formed by polymerization of a reactive monomer or mixture of reactive monomers. Useful monomers include acrylates and methacrylates as well as styrene and substituted styrenes, reactive epoxy monomers and the like. Such polymerization of reactive monomers or mixtures of reactive monomers may be carried out by any type of initiation, such as by thermal or photo initiation or by electron beam or x-ray initiation.

FIG. 3 illustrates another embodiment of the present invention wherein a tapered optical waveguide 60 comprises an inclusion 68 having a non-uniform refractive index such as a graded refractive index as designated by a dotted formation surrounding a smaller dotted formation. Such a non-uniform refractive index is graphed in FIG. 3a for the values which lie along the line segment X of FIG. 3. The profile of refractive index of inclusion 68 may either increase from the sidewall towards the optical axis of the waveguide as shown in FIG. 3a or it may decrease from the sidewalls toward the optical axis as shown in FIG. 3b. The exact shape of the refractive index profile is not overly critical, but the change in refractive index from the sidewall of the waveguide to the axis of the waveguide must be sufficient to achieve the benefits of the optical waveguide when utilized within an array. The change in refractive index should be greater than 0.005, preferably greater than 0.01 and most preferably greater than 0.02. In general, the change in refractive index within inclusion 68 must be greater than for a discrete inclusion 58 to achieve comparable optical benefits when utilized within an array. This is due to the fact that the discrete inclusion 58 forms an internal surface within the waveguide which will cause additional refractive effects for some of the light rays which pass through the waveguide.

Figure 4:
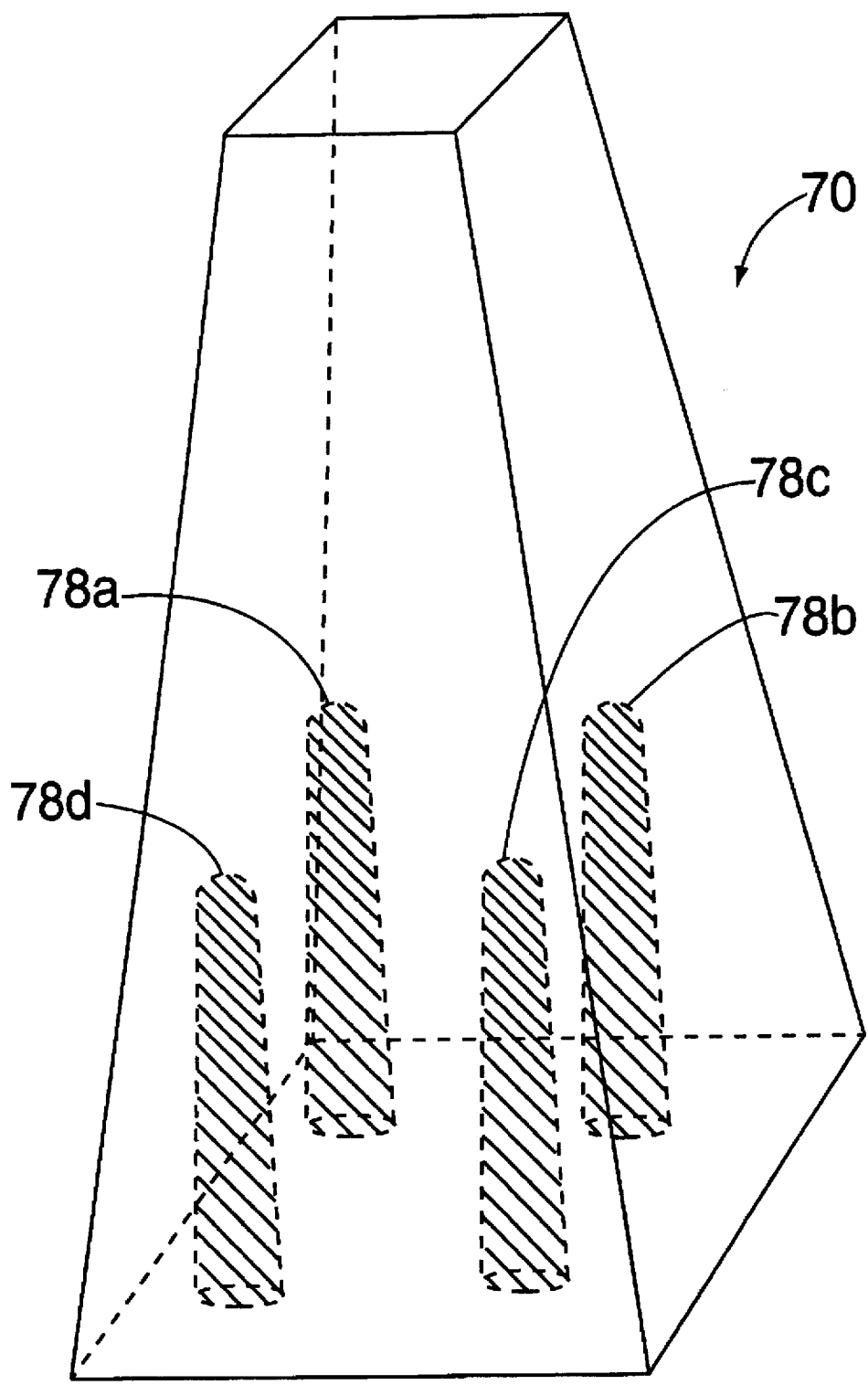
FIG. 4 is an alternate embodiment of the present invention showing multiple inclusions.

FIG. 4 illustrates another embodiment of the present invention wherein multiple inclusions 78a–78d are present within a single tapered optical waveguide 70. Any number of such inclusions are useful in the practice of the invention, but it is realized that the number must be finite so that the size of the inclusions does not become so small that diffractive, or scattering phenomenon become important, as this will result in unwanted loss of light and increased scatter of ambient light. Typically 1 to 100 such inclusions are useful, more preferably 1 to 30 such inclusions and most preferred are index inclusion tapered optical waveguides containing 1 to 16 inclusions. Furthermore, such multiple inclusions may be any combination of discrete inclusions and inclusions having a refractive index gradient.

Figure 5:
FIG. 5 is a substrate useful in the practice of the present invention.

The preferred method of creating the optical waveguide of the present invention waveguides represents an improvement over the method of U.S. Pat. No. 5,462,700. U.S. Pat. No. 5,462,700 teaches a waveguide substrate 2 as illustrated in FIG. 5 being useful in practicing the disclosed process. Waveguide substrate 2 comprises substrate 4 and an optional adhesion promoting layer 6. At a minimum, substrate 4 is transparent to light within the wavelength range from about 400 to about 700 nm, as this visible wavelength region is the most desirable region in which the optical waveguides to be formed will operate. It is more preferred that the substrate 4 also transmits ultraviolet light in the region from about 250 to about 400 nm as this is the region in which many useful photoinitiators absorb light. Additionally, if it is desired to utilize the tapered waveguide array in the near infrared region, from about 700 nm to about 2000 nm, then it would be preferred to use a substrate 4 which is transparent in that region as well. The index of refraction of substrate 4 may range from about 1.45 to about 1.65. The most preferred index of refraction is from about 1.50 to about 1.60. Substrate 4 may be made from any transparent solid material. Preferred materials are commercially available and include transparent polymers, glass, and fused silica. Useful transparent polymers include polyesters, polyacrylates and methacrylates, polystyrene, and polycarbonates. Desired characteristics of these materials include mechanical and optical stability at typical operating temperatures of the display device. Compared with glass, transparent polymers have the added advantage of structural flexibility which allows products to be formed in large sheets and then cut and laminated as necessary. The preferred materials for substrate 4 are glass and polyester such as polyethylene terephthalate. The thickness of substrate 4 may vary widely. Preferably, the thickness of substrate 4 is about 1 mil (0.001 inch or 25 microns) to about 10 mil (0.01 inch or 250 microns).

Preferably, the adhesion promoting layer 6 is an organic material which is light transmissive and causes the waveguides to be formed thereon, especially waveguides formed from polymers as for example photocrosslinked acrylate monomer materials, to adhere strongly to substrate 4. Such materials are well known to those skilled in the art, are commercially available, and will not be described herein in great detail. For example, if substrate 4 is glass and waveguides are formed from acrylate monomer materials, then an appropriate adhesion promoting layer 6 may be formed by reacting the glass surface with certain types of silane compounds including 3-(trimethoxysilyl)propyl methacrylate; 3-acryloxypropyl trichlorosilane; and trimethylsilylpropylmethacrylate. If substrate 4 is polyethylene terephthalate (PET) and waveguides are formed from acrylate monomer materials for example, adhesion promoting layer 6 may be provided by using an adhesion treated PET film such as Hostaphan 4500 (Hoechst-Celanese). If substrate 4 is emulsion coated and the waveguides are formed from acrylate monomer materials, for example, adhesion promoting layer 6 may be formed from 3-acryloxypropyltrichlorosilane (Hüls America A0396). The thickness of adhesion promotion layer 6 may vary widely. Usually, the thickness of adhesion promoting layer 6 is as used in the end application such as conventional direct view flat panel display devices. Preferably, adhesion promoting layer 6 is less than about 1 micrometer thick. If it is determined that adhesion of the waveguides to a bare substrate 4 is sufficient, then adhesion layer 6 may be omitted.

Figure 6:
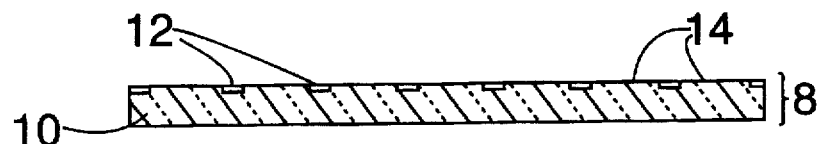
FIG. 6 is a photomask of the prior art.
Figure 6A:
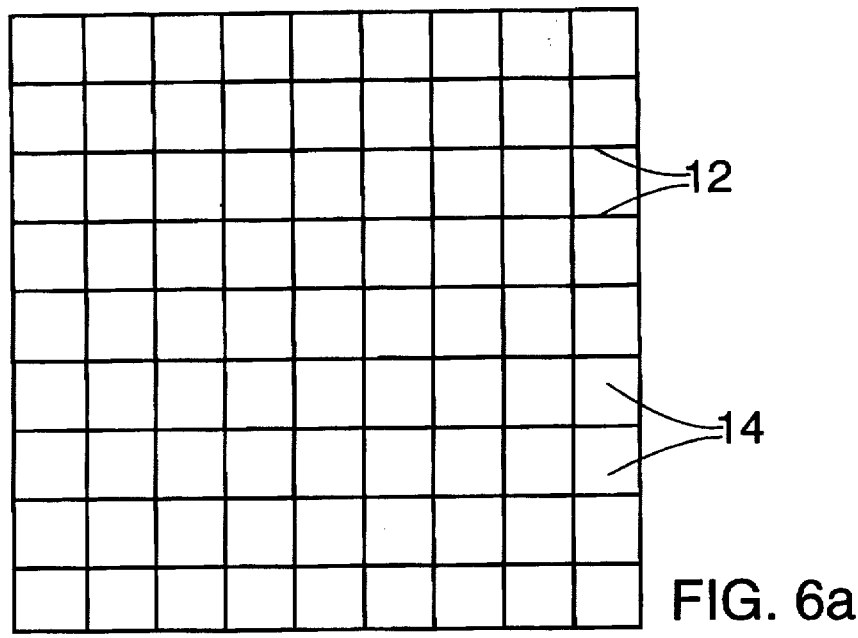
FIG. 6a is a plan view of a photomask of the prior art.

A photomask 8 as illustrated in FIG. 6 controls the spatial profile of the ultraviolet light, that is, where it falls upon the layer of photopolymerizable material. Photomask 8 comprises transparent substrate 10 which has opaque regions 12 that define transparent regions 14 on one surface which allow radiation directed at photomask 8 to fall only on the desired regions of photopolymerizable material. As shown in FIG. 6A, photomask 8 has a pattern of opaque regions 12 and transparent regions 14 which comprise the desired pattern of the array of tapered waveguides. The pattern in FIG. 6A is one of many useful patterns and is intended to be illustrative only. Many other patterns of transparent and opaque regions are useful within the scope of the present invention. Commercially available photomasks are useful in the present process.

Figure 7:
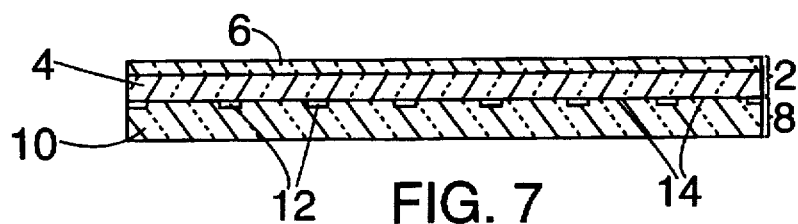
FIG. 7 is a combination of the substrate of FIG. 5 and the photomask of FIG. 6.

In the first step, disclosed in U.S. Pat. No. 5,462,700, photomask 8 is placed in substantial contact with waveguide substrate 2 as illustrated in FIG. 7. As used herein, the term "substantial contact" means that the photomask 8 and waveguide substrate 2 do not become separated during the remainder of the present process. Any known method for maintaining substantial contact between two substrates may be used herein. For example, a liquid such as isopropanol, methanol, or water may be placed between photomask 8 and waveguide substrate 2 and then a rubber roller may be used to press photomask 8 and waveguide substrate 2 together. Other known methods for maintaining substantial contact between two substrates include mechanical fixturing, vacuum contact, static contact and others which enable off-contact or proximity printing, soft-contact printing, and scanning.

In the second step, a substantially uniform thickness of a photopolymerizable mixture is placed on the waveguide substrate so that the waveguide substrate is positioned between the photopolymerizable mixture and the photomask wherein the photopolymerizable mixture comprises a reactive monomer, or mixture of such monomers, and a photoinitiator, or mixture of such photoinitiators, and the photoinitiator is present in an amount sufficient to form a gradient of substantially collimated ultraviolet light across the thickness of the photopolymerizable mixture during a subsequent step. Any known method for placing a substantially uniform thickness of a photopolymerizable material on a substrate may be used in the present process. As used herein, the term "substantially uniform thickness" means less than about 10 percent variation in thickness across the area of the mixture, and more preferably less than about 5 percent variation in thickness. As will be explained in more detail later, the thickness of photopolymerizable mixture is the desired final length of a photopolymerized tapered waveguide which, in turn, is determined by the minimum transverse distance across the waveguide input surface. Preferably, the length of a photopolymerized tapered waveguide or the thickness of photopolymerizable mixture is from about 1 to about 4000 microns, more preferably from about 15 to about 1600 microns, and most preferably from about 50 to about 400 microns.

Figure 8:
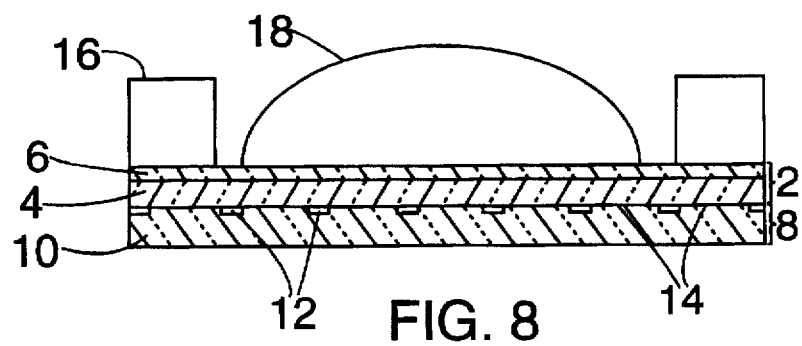
FIG. 8 is the FIG. 7 combination with a photopolymerizable material useful in the practice of the present invention.
Figure 9:
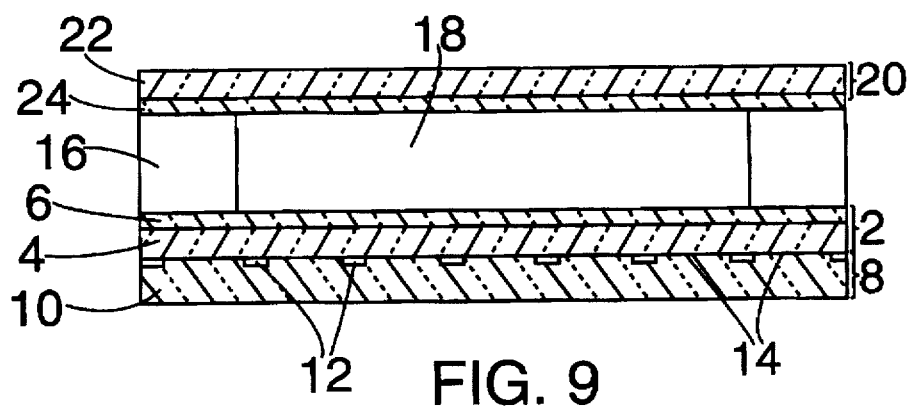
FIG. 9 shows

Methods for placing a substantially uniform thickness of photopolymerizable material include spin coating, roller coating, doctor blading, patch coating using a slot, extrusion coating, and the like. FIGS. 8 and 9 illustrate another method. Spacers 16 are positioned on waveguide substrate 2. The height of spacers 16 is the desired final length of the photopolymerized tapered waveguide. Photopolymerizable mixture 18 is then placed on waveguide substrate 2 so that waveguide substrate 2 is positioned between photopolymerizable mixture 18 and the photomask 8.

Photopolymerizable material 18 comprises two essential ingredients. The first essential ingredient is a photopolymerizable monomer, especially an ethylenically unsaturated monomer which will provide a transparent solid polymer material. Preferred solid polymer materials have an index of refraction between about 1.45 and about 1.65 and include commercially available polymethylmethacrylate, polycarbonate, polyester, polystyrene, and polymers formed by photopolymerization of acrylate or methacrylate monomers. More preferred materials have an index of refraction between about 1.50 and about 1.60 and include polymers formed by photopolymerization of acrylate monomer mixtures composed of urethane acrylates and methacrylates, ester acrylates and methacrylates, epoxy acrylates and methacrylates, (poly) ethylene glycol acrylates and methacrylates and vinyl containing organic monomers. It is useful to utilize a mixture of monomers in the photopolymerizable mixture in order to fine tune the properties of the composition such as to fine tune crosslinking density, viscosity, adhesion, curing rate, and refractive index and to reduce discoloration, cracking, and delamination properties of the photopolymer formed from the composition.

Examples of useful more preferred monomers include methyl methacrylate; n-butyl acrylate (BA); 2-ethylhexyl acrylate (EHA); isodecyl acrylate; 2-hydroxyethyl acrylate; 2-hydroxypropyl acrylate; cyclohexyl acrylate (CHA); 1,4-butanediol diacrylate; ethoxylated bisphenol A diacrylate; neopentylglycol diacrylate (NPGDA); diethyleneglycol diacrylate (DEGDA); diethylene glycol dimethacrylate (PEGDMA); 1,6-hexanediol diacrylate (HDDA); trimethylol propane triacrylate (TMPTA); pentaerythritol triacrylate (PETA); pentaerythritol tetra-acrylate (PETTA); phenoxyethyl acrylate (PEA); β-carboxylethyl acrylate (β-CEA); isobornyl acrylate (IBOA); tetrahydrofurfuryl acrylate (THFFA); propylene glycol monoacrylate (MPPGA); 2-(2-ethoxyethoxy) ethyl acrylate (EOEOEA); N-vinyl pyrrolidone (NVP); 1,6-hexanediol dimethacrylate (HDDMA); triethylene glycol diacrylate (TEGDA) or dimethacrylate (TEGDMA); tetraethylene glycol diacrylate (TTEGDA) or dimethacrylate (TTEGDMA); polyethylene glycol diacrylate (PEGDA) or dimethacrylate (PEGDMA); dipropylene glycol diacrylate (DPGDA); tripropylene glycol diacrylate (TPGDA); ethoxylated neopentyl glycol diacrylate CNPEOGDA); propoxylated neopentyl glycol diacrylate (NPPOGDA); aliphatic diacrylate (ADA); alkoxylated aliphatic diacrylate (AADA); aliphatic carbonate diacrylate (ACDA); trimethylolpropane trimethacrylate (TMPTMA); ethoxylated trimethylolpropane triacrylate (TMPEOTA); propoxylated trimethylolpropane triacrylate (TMPPOTA); glyceryl proxylated triacrylate (GPTA); tris (2-hydroxyethyl) isocyanurate triacrylate (THEICTA); dipentaerythritol pentaacrylate (DPEPA); ditrimethylolpropane tetraacrylate (DTMPTTA); and alkoxylated tetraacrylate (ATTA).

Especially useful are mixtures wherein at least one monomer is a multifunctional monomer such as a diacrylate or triacrylate, as these will produce a network of crosslinks within the reacted photopolymer. The most preferred materials for use in the method of the invention are crosslinked polymers formed by photopolymerizing mixtures of ethoxylated bisphenol A diacrylate and trimethylol propane triacrylate. The index of refraction of the most preferred materials ranges from about 1.53 to about 1.56. It is not essential that the refractive index of the transparent solid material be homogeneous throughout the waveguide element. It may be advantageous to cause to be present, inhomogeneities in refractive index, such as striations or scattering particles or domains, as these inhomogeneities may further increase the divergence of light from the output of the waveguide array.

The amount of monomer in photopolymerizable material may vary widely. The amount of monomer or the total amount of a mixture of monomers is usually from about 60 to about 99.8 percent by weight of the photopolymerizable material, preferably from about 80 to about 99 percent by weight of the photopolymerizable material, and more preferably from about 85 to about 99 percent by weight of the photopolymerizable material.

As another essential component, the polymerizable material 18 includes a photoinitiator which is activated by actinic radiation to produce activated species which lead to photopolymerization of the monomer. The photoinitiator system will contain a photoinitiator and preferably a conventional sensitizer which extends the spectral response into regions having spectral utility, e.g. the near ultraviolet region and the visible spectral regions where lasers excite and where many common optical materials are transmissive. Usually the photo-initiator is a free radical-generating addition polymerization initiator activated by actinic light and is preferably thermally inactive at and below room temperature (e.g. about 20° C. to about 25° C.)

Illustrative of such initiators are those described in U.S. Pat. No. 4,943,112 and references cited therein. Preferred free radical initiators are 1-hydroxy-cyclohexyl-phenyl ketone (Irgacure 184); benzoin; benzoin ethyl ether; benzoin isopropyl ether; benzophenone; benzidimethyl ketal (Irgacure 651); α,α-diethyloxy acetophenone, α,α-dimethyloxy-α-hydroxy acetophenone (Darocur 1173); 1-[4 (2-hydroxyethoxy)phenyl]-2-hydroxy-2-methyl-propan-1-one (Darocur 2959); 2-methyl-1-[4-methylthio)phenyl]-2-morpholino-propan-1-one (Irgacure 907); 2-benzyl-2-dimethylamino-1-(4-morpholinophenyl)-butan-1-one (Irgacure 369); poly{1-[4-(1-methylvinyl)phenyl]-2-hydroxy-2-methyl-propan-1-one}(Esacure KIP); [4-(4-methylphenylthio)-phenyl]phenylmethanone (Quantacure BMS); di-campherquinone; and 50% 1-hydroxycyclohexyl phenyl ketone and 50% benzophenone (Irgacure 500).

The more preferred photoinitiators includes benzidimethyl ketal (Irgacure 651); α,α-diethyloxy acetophenone; α,α-dimethyloxy-α-hydroxy acetophenone (Darocur 1173); 1-hydroxy-cyclohexyl-phenyl ketone (Irgacure 184); 1-[4-(2-hydroxyethoxy)phenyl]-2-hydroxy-2-methyl-propan-1-one (Darocur 2959); 2-methyl-1-4-(methylthio)phenyl]-2-morpholino-propan-1-one (Irgacure 907); 2-benzyl-2-dimethylamino-1-(4-morpholinophenyl)butan-1-one (Irgacure 369); and 50% 1-hydroxycyclohexyl phenyl ketone and 50% benzophenone (Irgacure 500). The most preferred photoinitiators are those which tend not to yellow upon irradiation and, thus, do not increase the coloration of the composition on the Gardner scale to a value of greater than 8 points on exposure to a temperature of 190° C. for 24 hours as determined by ASTM D1544-80. Such photoinitiators include benzidimethyl ketal (Irgacure 651); α,α-dimethyloxy-a-hydroxy acetophenone (Darocur 1173); 1-hydroxy-cyclohexyl-phenyl ketone (Irgacure-184); 1-[4-(2-hydroxyethoxy)phenyl]-2-hydroxy-2-methyl-propan-1-one (Darocur 2959); and 50% 1-hydroxycyclohexyl phenyl ketone and 50% benzophenone (Irgacure 500).

The amount of photoinitiator which must be present to form a gradient of substantially collimated ultraviolet light across the thickness of the photopolymerizable mixture 18 during a subsequent step is from about 0.1 to about 12 percent by weight based on the total weight of the photopolymerizable material. The amount of photoinitiator is preferably from about 0.5 to about 12 percent by weight, and more preferably from about 0.5 to about 8 percent by weight based on the total weight of the photopolymerizable material. It is realized that the desired gradient will be influenced not only by the concentration of the initiator but by the choice of irradiating wavelengths present in the exposure source, which may be controlled by those skilled in the art.

In addition to the essential ingredients, the photopolymerizable material may include various optional ingredients such as stabilizers, inhibitors, plasticizers, optical brightners, release agents, chain transfer agents, other photopolymerizable monomers, and the like.

The photopolymerizable material preferably includes a stabilizer to prevent or reduce degradation which leads to property deterioration such as cracking and delamination alter heat aging at 190° C. in air for 24 hrs. as defined by ASTM D 4538-90A and yellowing (coloration of greater than 8 on the Gardner Color Scale as determined by ASTM D 1544-80) after such heat aging. Such stabilizers include UV absorbers, light stabilizers, and antioxidants.

UV absorbers include hydroxyphenyl benzotriazoles, such as 2-[2-hydroxy-3,5-di (1,1-di methylbenzyl)phenyl]-2-H-benzotriazole (Tinuvin 900); Poly(oxy-1,2-ethanediyl), α-(3-(3-(2H-benzyotriazol-2-yl)-5-(1, 1-dimethylethyl)-4-hydroxyphenyl)-1-oxopropyl)-ω-hydroxy (Tinuvin 1130); and 2-[2-hydroxy-3,5-di(1,1-dimethylpropyl) phenyl]-2-H-benzotriazole (Tinuvin 238) and hydroxybenzophenones such as 4-methoxy-2-hydroxybenzophenone and 4-n-octoxy-2-hydroxybenzophenone. Light stabilizers include hindered amines such as 4-hydroxy-2,2,6,6-tetramethylpiperidine, 4-hydroxy- 1,2,2,6,6-pentamethylpiperidine, 4-benzoyloxy-2,2,6,6-tetramethylpiperidine, bis(2,2,6,6-tetramethyl-4-piperidinyl)sebacate (Tinuvin 770); bis(1,2,2,6,6-pentamethyl-4-piperidinyl)sebacate (Tinuvin 292); bis(1,2, 2,6,6-pentamethyl-4-piperidinyl)-2-n-butyl-2-(3,5-di -tert-butyl-4-hydroxybenzyl) malonate (Tinuvin 144); and polyester of succinic acid with N-β-hydroxy-ethyl-2,2,6,6-tetramethyl-4-hydroxy-piperidine (Tinuvin 622). Antioxidants include substituted phenols such as 1,3,5-trimethyl-2, 4,6-tris (3,5-di-tert-butyl)-4-hydroxybenzyl)benzene, 1,1,3-tris-(2-methyl-4-hydroxy-5-tert-butyl)phenyl)butane, 4,4'-butylidene-bis-(6-tert-butyl-3-methyl)phenol, 4,4'-thiobis-(6-tert-butyl-3-methyl)phenol, tris-(3,5-di-tert-butyl-4-hydroxybenzyl)isocyanurate, cetyl-3,5-di-tert-butyl-4-hydroxybenzene (Cyasorb UV2908); 3,5-di-tert-butyl-4-hydroxybenzoic acid, 1,3,5-tris-(tert-butyl-3-hydroxy-2,6-dimethylbenzyl) (Cyasorb 1790); stearyl-3-(3,5-di-tert-butyl-4-hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy)hydrocinnamate (Irganox 1035).

The preferred stabilizers used in this invention are antioxidants. Preferred antioxidants are selected from substituted phenols such as 1,3,5-trimethyl-2,4,6-tris(3,5-di-tert-butyl)-4-hydroxybenzyl)benzene, 1,1,3-tris-(2-methyl-4-hydroxy-5-tert-butylphenyl)butane, 4,4'-butylidene-bis-(6-tert-butyl-3-methylphenol, 4,4'-thiobis-(6-tert-butyl-3-methylphenol, tris-(3,5-di-tert-butyl-4-hydroxybenzyl) isocyanurate, cetyl-3,5-di-tert-butyl-4-hydroxybenzene (Cyasorb UV 2908); 3,5-di-tert-butyl-4-hydroxybenzoic acid, 1,3,5-tris-tert-butyl-3-hydroxy-2,6-dimethylbenzyl) (Cyasorb 1790); stearyl-3-(3,5-di-tert-butyl-4hydroxyphenyl)proprionate (Irganox 1076); pentaerythritol tetrabis(3,5-di-tert-butyl-4-hydroxyphenyl) (Irganox 1010); and thiodiethylene-bis-(3,5-di-tert-butyl-4-hydroxy) hydrocinnamate (Irganox 1035). The most preferred stabilizers include pentaerythritol tetrabis(3,5-di-tert-butyl-4-hydroxyphenyl) (Irganox 1010); thiodiethylene-bis-(3,5-di-tert-butyl-4-hydroxy)hydrocinnamate (Irganox 1035); and stearyl-3-(3,5-di-tert-butyl-4-hydroxyphenyl)proprionate (Irganox 1076).

The amount of stabilizers in the composition may vary widely and is usually from about 0.1 to about 10 percent by weight of the photopolymerizable material. The amount of stabilizer is preferably from about 0.1 to about 5 percent by weight of the photopolymerizable material and more preferably from about 0.2 to about 3 percent by weight of the photopolymerizable material.

Cover plate 20 is then placed over photopolymerizable mixture 18 and pressed down until it is in contact with spacers 16 as illustrated in FIG. 9. Cover plate 20 comprises cover substrate 22 and release layer 24. Cover substrate 22 may be made of any material such as glass, quartz, fused silica, polymer sheet, or metal sheet. Release layer 24 may be a fluorinated polymer such as Teflon AF®, a polysiloxane, or an untreated polymer film such as polyethylene terephthalate.

In another embodiment of the process, waveguide substrate 2 is not used and the photopolymerizable material 18 is placed directly on photomask 8 (not illustrated).

Figure 10:
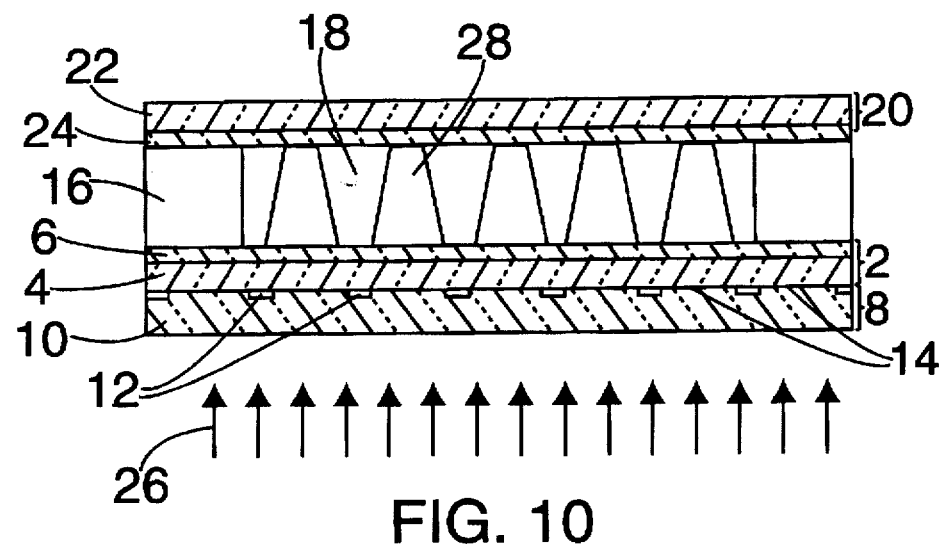
FIG. 10 illustrates exposure of FIG. 9 to substantially collimated light.

In the next step of both embodiments of the process, while maintaining the photopolymerizable mixture substantially stationary relative to the substantially collimated ultraviolet light, the photopolymerizable mixture is exposed through the transparent regions of the photomask to substantially collimated ultraviolet light for a time sufficient to form an array of tapered photopolymerized waveguides wherein: (i) the tapered end of each of the waveguides extends outward from the substrate or photomask, (ii) each of the waveguides has a light input surface adjacent the substrate or photomask and a light output surface distal from the light input surface, and (iii) the area of the light input surface of each of the waveguides is greater than the area of its light output surface. The assembly of FIG. 9 is then exposed to substantially collimated actinic radiation 26 as illustrated in FIG. 10. As used herein, the term "substantially collimated" means that the light which exits the light source does not diverge from the optical axis of the exposure system by more than 10 degrees.

The photopolymerizable material is exposed to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, as for example light from a laser.

Sources of actinic light, and exposure procedures, times, wavelengths and intensities may vary widely depending on the desired degree of polymerization, the index of refraction of the photopolymer, and other factors known to those of ordinary skill in the art. Such conventional photopolymerization processes and their operational parameters are well known in the art. See for example in S. P. Pappas Ed. "Radiation Curing: Science and Technology" Plenum Press, New York, NY; D. R. Randell Ed., "Radiation Curing of Polymers, II, Royal Society of Chemistry, Cambridge, Mass; and C. E. Hoyle and J. F. Kristle, Ed., "Radiation Curing of Polymeric Materials", American Chemical Society. Accordingly, they will not be described herein in great detail.

Sources of actinic radiation and the wavelength of the radiation may vary widely, and any conventional wavelengths and sources may be used. It is preferable that the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) and exposure by deep ultraviolet light (190–300 nm wavelength) are preferred. Convenient sources are high pressure xenon or mercury-xenon arc lamps fitted with appropriate optical filters to select the desired wavelengths for processing. Also, short wavelength coherent radiation is useful for the practice of this invention. An argon ion laser operating in the "UV" mode at several wavelengths near 350 nm is desirable. Also, a frequency-doubled Argon ion laser with output near 257 nm wavelength is desirable. Electron beam or ion beam excitation may also be utilized.

The most preferred actinic radiation is ultraviolet light in the 300–400 nm region, such as produced by a mercury, xenon, or mercury xenon lamp.

Substantially collimated actinic radiation 26 passes through transparent regions 14 of photomask 8 and causes a photopolymerization reaction in the exposed regions 28 of photopolymerizable mixture 18 which align with the transparent regions 14 of the photomask 8 as illustrated in FIG. 10. No, or in some cases, only limited photoreaction occurs in those areas of photopolymerizable mixture 18 which are shielded from the substantially collimated actinic radiation 26 by opaque regions 12 of photomask 8.

In order that the exposed regions 28 have the proper tapered shape, the optical absorption of the photopolymerizable mixture 18 at the wavelengths of the ultraviolet light must be high enough such that a gradient of actinic radiation intensity is established through the film during actinic radiation exposure. That is, the amount of actinic radiation available in the photopolymerizable mixture 18 to cause the initiation of the photoreaction will decrease from the photomask 8 side towards the cover plate 20 side, due to the finite absorption of the photopolymerizable mixture 18. This gradient of actinic radiation causes a gradient in the amount of photopolymerization reaction that occurs across the thickness of photopolymerizable mixture 18, and this results in the unique tapered geometry of the developed waveguide structures, a geometry which is easily accessible with the process of the present invention.

The gradient in the amount of photopolymerization which occurs across the thickness of photopolymerizable mixture 18 may be further influenced by the presence of dissolved oxygen gas in the photopolymerizable mixture 18, such oxygen acting to curtail or quench the photopolymerization reaction except in those areas where all oxygen has been consumed by the free radicals produced in the photopolymerization process. Such action of dissolved oxygen gas on the progress of photopolymerization reactions is well known to those skilled in the art. Further, the requisite geometry of the photopolymer structures may be further influenced by the process of self-focusing That is, the light falling on the surface of the photopolymerizable mixture 18 nearest the photomask 8 initiates photopolymerization at that surface, and since the refractive index of the solidified polymer material is higher than that of the liquid monomer, it acts to refract the light passing through it. In this manner, the aerial image of light falling on the photopolymerizable mixture nearer to the cover plate side of the layer is altered through refraction caused by the already-polymerized material which lies closer to the photomask. This effect may cause a narrowing of the resultant polymerized structure from the mask side, upon which the imaging light was directed, towards the cover plate 20.

Figure 11:
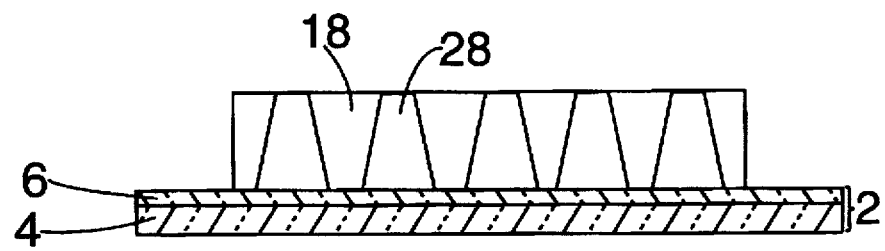
FIG. 11 illustrates FIG. 10 after removal of the photomask and cover plate.
Figure 12:
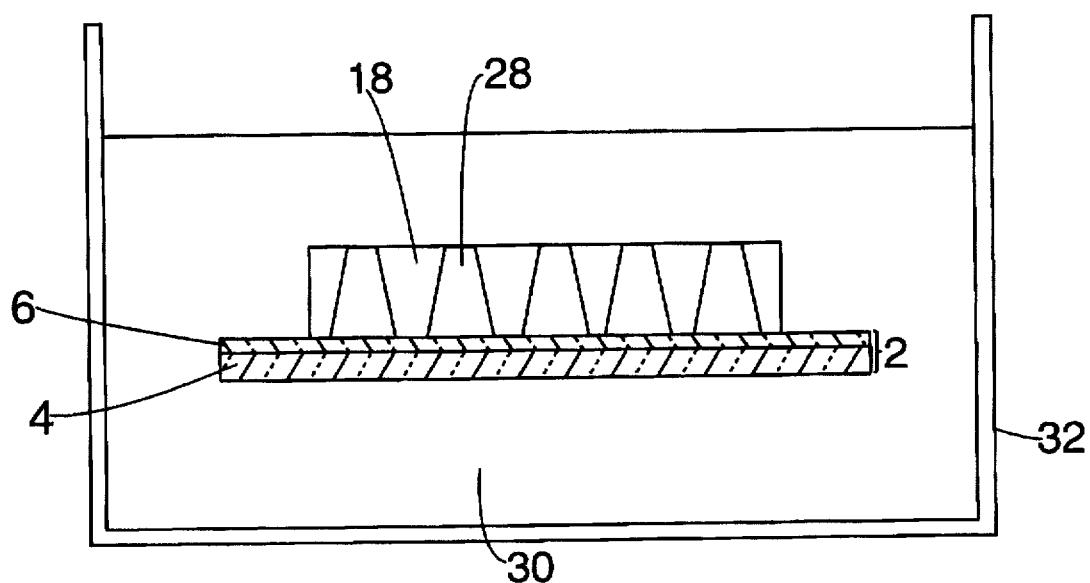
FIG. 12 illustrates the removal of unexposed polymerizable material from the FIG. 11 combination.
Figure 13:
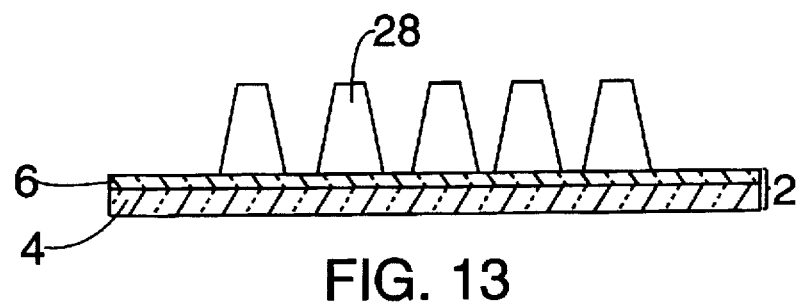
FIG. 13 illustrates the combination resulting from FIG. 12.
Figure 13A:
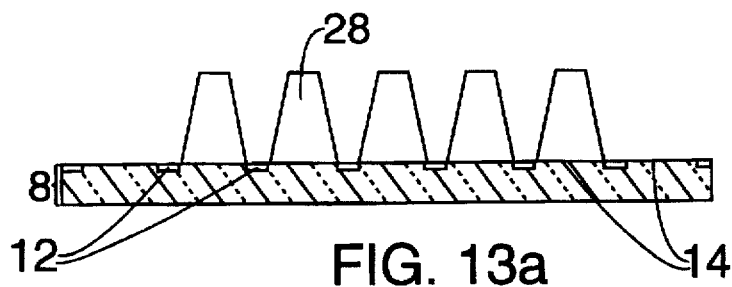
FIG. 13a illustrates the combination resulting from another embodiment of the prior art process.
Figure 14:
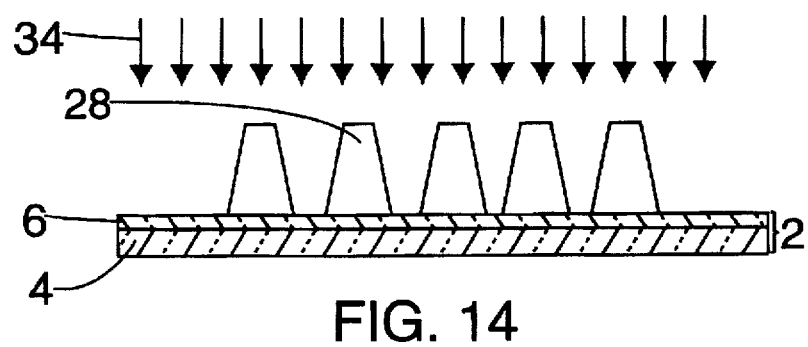
FIG. 14 illustrates the flood exposure of the FIG. 13 combination.
Figure 15A:
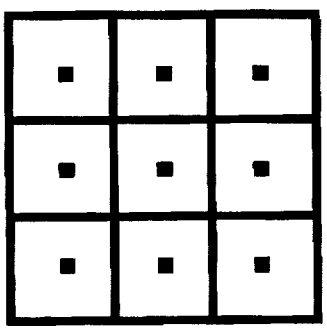
FIG. 15a through 15l are exemplary photomasks useful in the practice of the present invention.
Figure 15B:
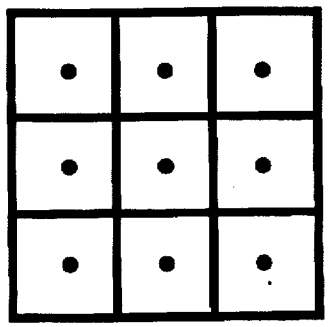
Figure 15C:
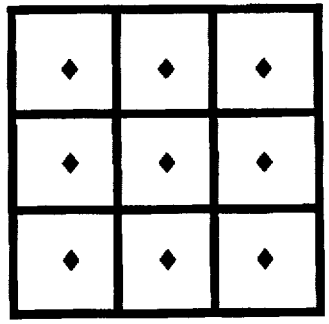
Figure 15D:
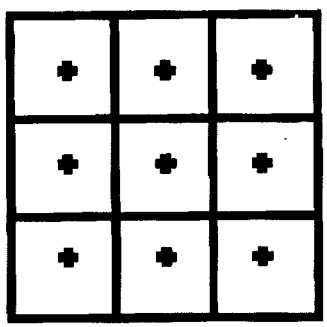
Figure 15E:
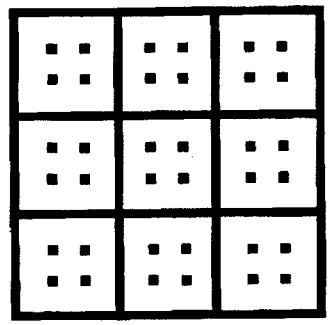
Figure 15F:
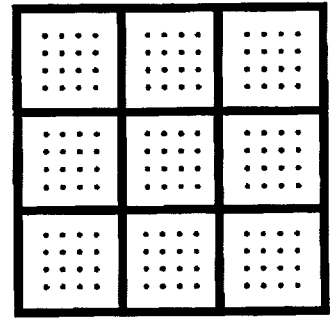
Figure 15G:
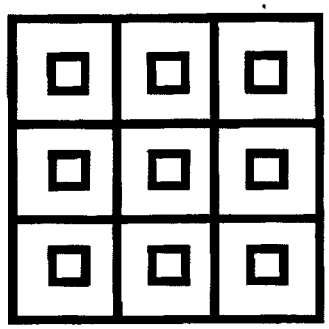
Figure 15H:
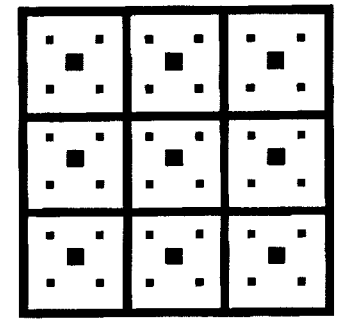
Figure 15I:
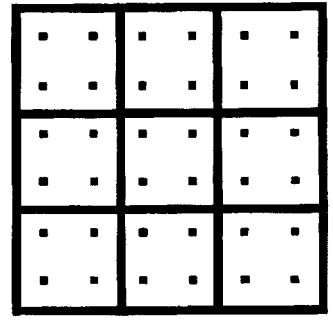
Figure 15J:
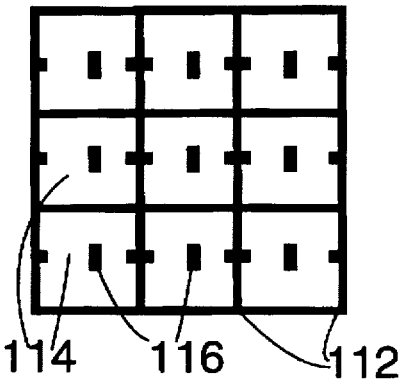
Figure 15K:
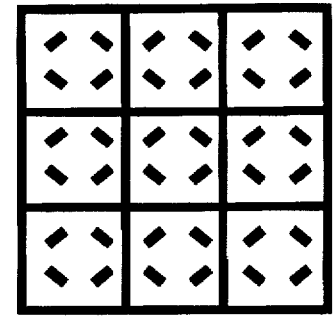
Figure 15L:
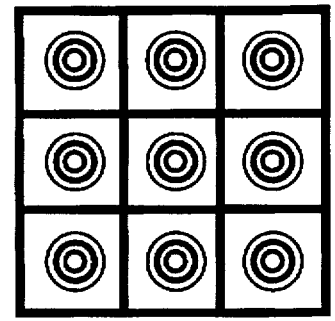

In the last step of both embodiments of the process, the photopolymerizable mixture which was unexposed to substantially collimated actinic radiation during the exposure step is removed. Photomask 8, spacers 16, and cover plate 20 with release layer 24 are removed as illustrated in FIG. 11. The unreacted monomers are washed away with a suitable solvent 30 such as acetone, methanol, or isopropanol in a container 32 as illustrated in FIG. 12 leaving a pattern of photopolymerized regions 28 on the waveguide substrate 2. The method of washing is known to those skilled in the art and can include submersion in a solvent bath, solvent curtains, sparay jets, injector-jet technology and other well-known methods. Depending upon the monomers selected, it may be possible to use aqueous-based solvents. The remaining final structure in the first embodiment of the present invention consists of photopolymerized regions 28 on waveguide substrate 2 as illustrated in FIG. 13. In the other embodiment of the disclosed process, the pattern of photopolymerized regions 28 remains on photomask 8 as illustrated in FIG. 13a. The final structure containing the array of tapered photopolymerized waveguides 28 may receive an optional post-development flood exposure to ultraviolet light 34 as illustrated in FIG. 14 to further harden the photopolymer material.

In a commercial batch production line, the photomask and substrate, if used, may be contacted at a first station. This assembly is then advanced to a second station where a collimated ultraviolet light source is located. A photopolymerizable mixture is placed on the substrate or photomask and exposed through the transparent regions of the photomask to the substantially collimated actinic radiation. The exposed assembly is then advanced to a third station wherein the photomask and unexposed photopolymerizable mixture are removed.

In a commercial continuous production line, a photopolymerizable mixture may be extruded between a flexible substrate and flexible cover plate (not illustrated). This assembly then travels between two rollers wherein one roller comprises a photomask having opaque and transparent regions thereon and an actinic radiation source situated inside the roller. The photopolymerizable mixture is then exposed through the transparent regions of the photomask to the substantially collimated actinic radiation. The cover plate is then removed from the exposed assembly and the exposed assembly advances around another roller through a solvent bath to remove unexposed mixture.

The method of the present invention comprises the process as set forth in U.S. Pat. No. 5,462,700 but includes additional structures on the photomask which is used to form the tapered waveguide elements via the photopolymerization reaction. Such structures are represented by additional opaque areas within the transmissive areas of the photomask which correspond to the input surfaces of the tapered optical waveguides. These additional opaque structures number from 1 to about 100 in number and cover, in total, an area which is less than 20 percent of the area of each transmissive region on the photomask. The shape of the additional opaque structures may vary widely and include square, rectangular, round, oval, cross and diamond shapes. In cases where more than one additional opaque structure is added to each transmissive area, all such structures may be the same area and shape or structures of the same area may have varying shapes or structures of varying area may all have the same shape or each structure may vary in both area and shape from all other structures within the same transmissive areas. Some of the different types of photomask pattern useful in the method of the invention, which correspond to various embodiments of the invention are shown in FIG. 15. In each case, the photomask pattern is comprised of solid, opaque lines 112 which separate discrete transmissive areas 114, as disclosed in U.S. Pat. No. 5,462,700. Within each transmissive area at least one opaque structure 116 is added in the method of the present invention. FIGS. 15a through 15l indicate a few of the variations in number, size and shape of opaque structures that are useful within the method of the present invention. This example is not meant to be inclusive of all the varieties of design which are within the scope of the invention, but is meant to serve as an indication of the variety of designs which are useful. Many other designs for opaque areas will be obvious to those who practice the art.

The function of the opaque structure 116 in the method of the present invention is to retard the photopolymerization of that portion of the reactive monomer mixture which is shadowed by opaque structure 116. When ultraviolet (UV) light passes through such a photomask in contact with a thin transparent substrate bearing a layer of reactive monomer mixture, it will initiate a rapid photopolymerization reaction in the monomer in those areas where the light is absorbed by the photoinitiator molecules. Areas of the monomer layer which are in the shadow of the opaque areas on the photomask will receive little UV light and will polymerize much more slowly. These areas will polymerize eventually due to light which diffracts into these regions and due to growing free radical chains which move into these regions via liquid diffusion. However, the delay in photopolymerization in the area of opaque structure 116 allows for the process of monomer diffusion to occur between the irradiated and unirradiated areas, which results in a difference of refractive index in the two areas once both have been converted to solid polymer. The amount of refractive index difference so created will depend in large pan on the makeup of the monomer mixture and the relative refractive indices and diffusion rates of the monomers therein. The resulting refractive index difference will be largest for a mixture of monomers wherein the refractive indices of the component monomers are different. One preferred monomer mixture consists of a blend of one aliphatic acrylate and one aromatic acrylate and at least one photoinitiator, as the refractive indices of the two monomers are substantially different in the visible light region. Especially preferred is a mixture of trimethylolpropane triacrylate and ethoxylated Bisphenol A diacrylate, with at least one photoinitiator capable of initiating a photopolymerization reaction when exposed with UV light. The components which make up the monomer mixture, the rate of the photopolymerization, which is determined by the functionality of the monomers, the amount of photoinitiator present and the intensity of the UV light source as well as the size, number and shape of the opaque areas on the photomask will all combine to determine the abruptness of the refractive index change which is produced in the areas which are shadowed by the opaque areas. The resulting refractive index difference may be sharply bounded, in which case the inclusion may appear as a discretely bounded entity as in FIG. 2 or it may be very gradual, in which case the inclusion consists of a gradient in refractive index in the cross-section of the tapered optical waveguide as in FIG. 3. In either case, it is essential that the index inclusion tapered optical waveguides remain separate entities when grouped together in an array, in order that they possess the requisite sidewalls for propagation of light via TIR and to allow sufficient interstitial volume for the addition of light absorptive material between the individual waveguides for use in optical applications which require direct viewing of the optical array. Thus, when such an array is produced by the preferred method of the present invention such inclusions must be limited in total area, in order that they may be formed before the interstitial areas between adjacent waveguides, that is, the areas which lie under the straight lines on the photomask, should become polymerized. For this reason, when using the preferred method of the current invention, such opaque areas cover, in total, an area which is less than 20 percent of the area of each transmissive region on the photomask. This limitation in the area of the opaque features on the photomask, however, does not imply a limit on the volume of the inclusion within the optical waveguide. Due to diffusion properties of the monomer system the volume occupied by the inclusion may be up to 100 percent of the volume of the tapered optical waveguide. For example, in FIG. 3, the volume occupied by the inclusion is approximately half of the volume of the waveguide.

Figure 16:
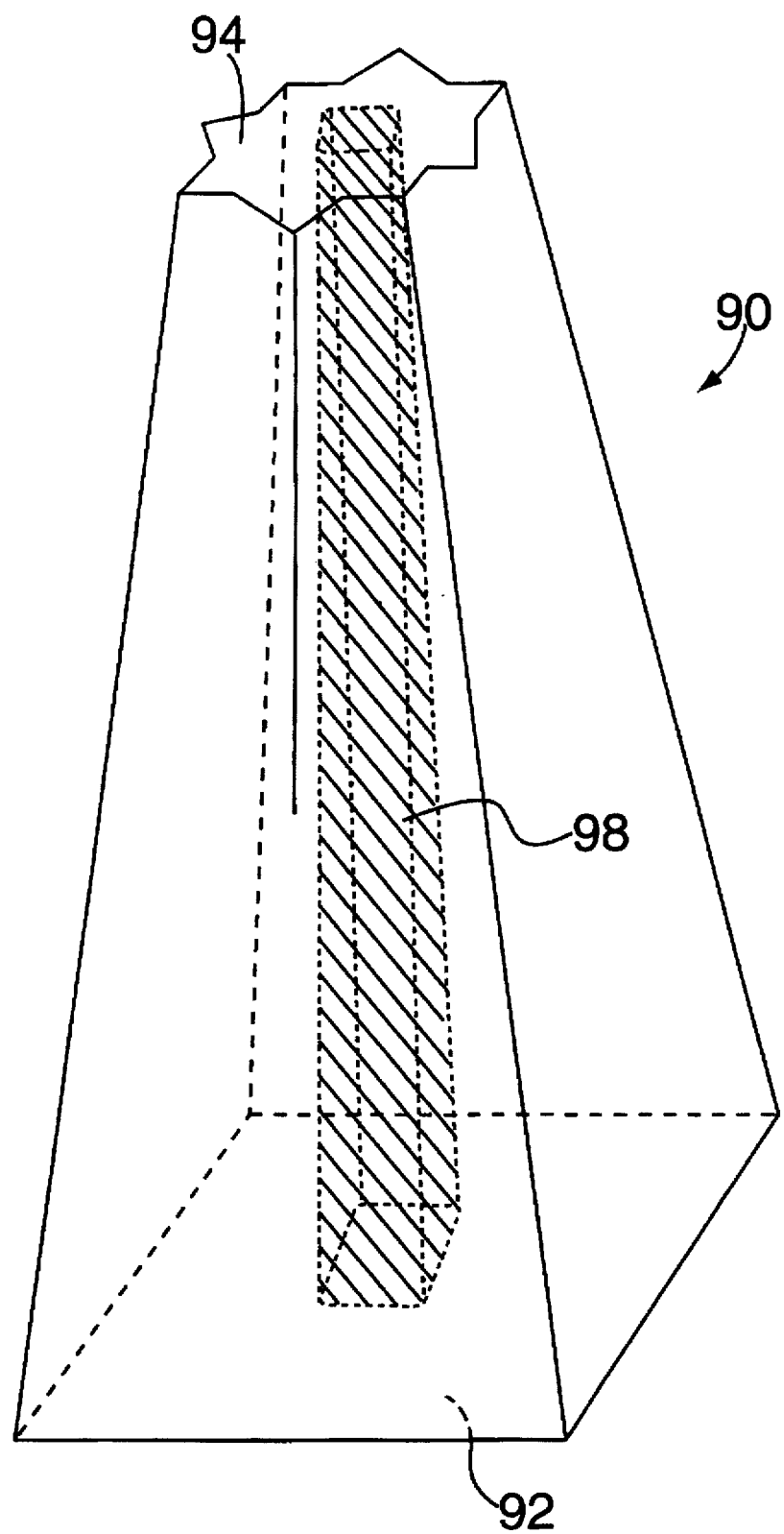
FIG. 16 is an alternate embodiment of the present invention.

FIG. 16 illustrates another embodiment of the present invention wherein the cross-sectional shape of optical waveguide 90, in a plane parallel to the input surface 92, is not constant along the optical axis from the input surface 92 to the output surface 94. The cross section of optical waveguide 90 is rectangular near its input surface 92, but progresses to an eight-pointed star at its output surface 94. Such an unexpected change in cross-sectional shape is due to the presence of inclusion structure 98 during the formation of such a tapered optical waveguide 90 by the preferred method of the present invention. That is, when additional opaque structures 116 are added to the transmissive region of a photomask that corresponds to the input surface of an optical waveguide they result in the formation of refractive index inclusions during the photopolymerization of the tapered waveguide element. Since the index inclusions begin to form as soon as the photopolymerization begins they will refract the light rays passing through them even as the tapered optical waveguide is forming and are capable of changing the cross-sectional shape of the resulting optical waveguide. The ability of the preferred method of the invention to alter the cross-sectional shape of the resulting waveguide along its optical axis is both unexpected and difficult to predict. Such changes in cross-sectional shape will differ depending on the shape, size and number of the opaque structures 116 used on the photomask during the creation of the index inclusion tapered optical waveguides.

FIG. 16 also illustrates a further embodiment of the invention where inclusion 98 is a continuous structure that coincides with input surface 92 and output surface 94.

Figure 17A:
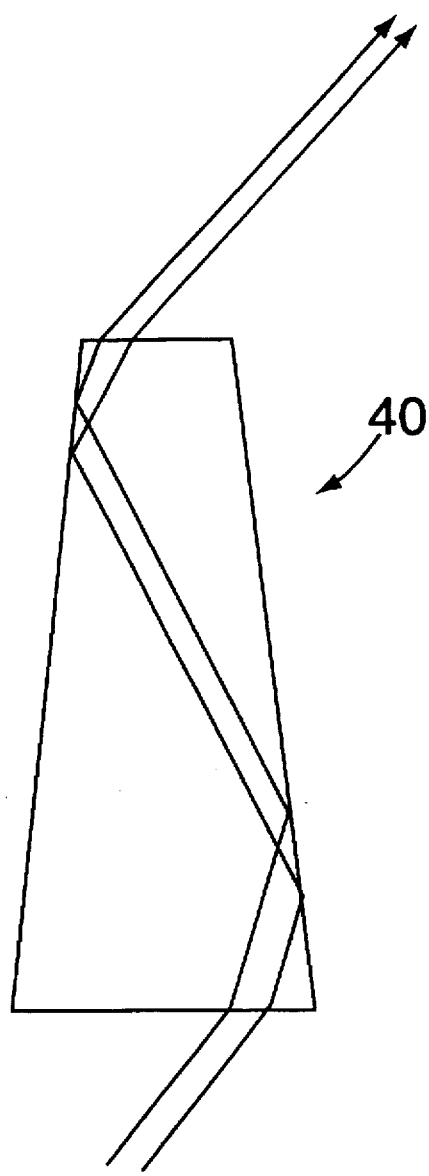
FIG. 17a illustrates light rays refracting through a waveguide of the prior art.
Figure 17B:
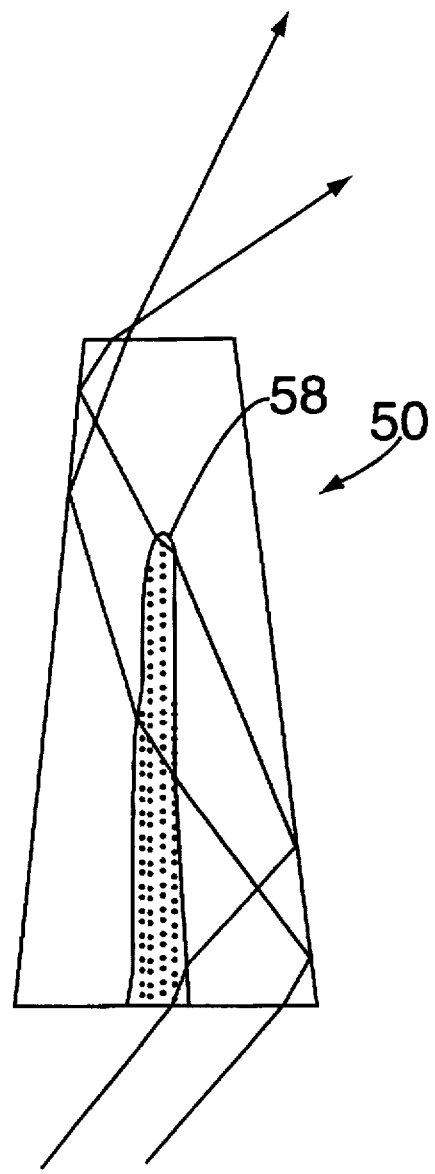
FIG. 17b illustrates light rays refracting through a waveguide of the present invention.

When the index inclusion tapered optical waveguides of the present invention are formed into an array of such waveguides by the preferred method of the invention, the resulting array exhibits two important improvements over the arrays described in U.S. Pat. No. 5,481,385. First, the angular light output of said array, when provided with the light from a nearly collimated light source such as that described in 08/149,219 is more uniform in distribution. That is, the angular distribution is smoothed from the discrete angular distributions provided by the reflection of light from the tapered waveguide sidewalls by the additional refraction, or bending, of light rays as they pass through the internal refractive index inclusion structures. Thus, two light rays entering the input surface of an optical waveguide of the present invention at equal angles and undergoing an equal number of reflections from the sidewalls of said waveguide, may still exit the output surface of said waveguide at non-equal exit angles (into the viewing field) due to the different paths which each ray takes through an inclusion. Such a ray relationship is shown in FIG. 17a, wherein the ray paths through a tapered waveguide 40 without inclusions tend to exit at equal angles; whereas 17b depicts the ray paths through a tapered waveguide 50 containing inclusion 58. Miller in U.S. Pat. No. 3,279,314 teaches that such discrete angular outputs resulting from the interaction of highly collimated lightsources with an array of "tapered lugs" is deleterious to the viewing characteristics of the array as it results in areas of high brightness, called "hotspots" and areas of low brightness and lowered contrast within the viewing plane. Miller has suggested that roughening the tips of the individual tapered elements will cause additional scatter to reduce this problem. However, introducing scattering into such an element or array of elements will result in additional unwanted loss of light and will increase backscatter of ambient light, thus decreasing the apparent image contrast to the viewer. By contrast, the present method and optical waveguides, when used as an array for a viewing screen, are sufficient to eliminate such nonuniformities without causing scattering losses or degrading the viewing contrast in ambient light.

Figure 18A:
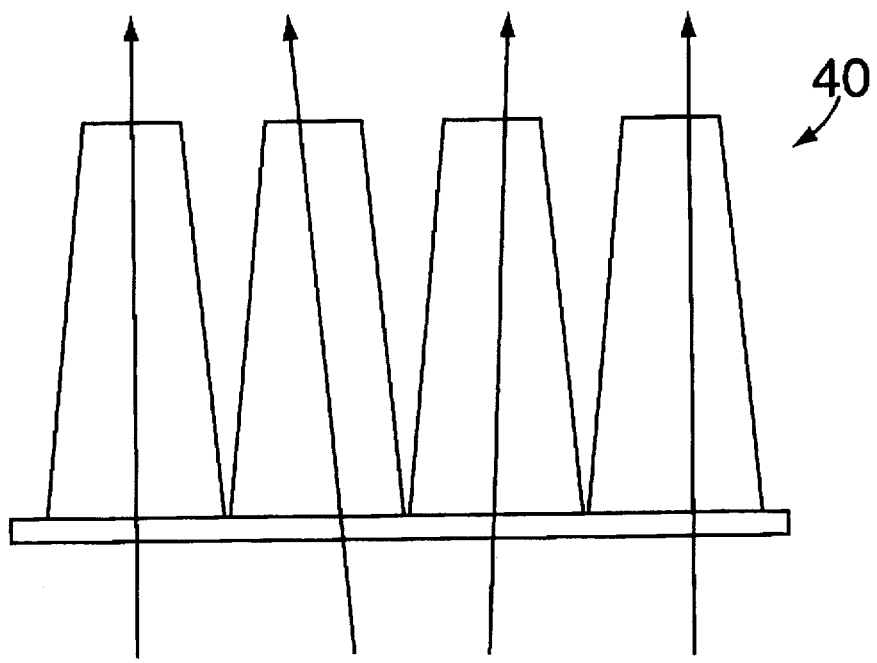
FIG. 18a illustrates light rays refracting through an array of waveguides of the prior art.
Figure 18B:
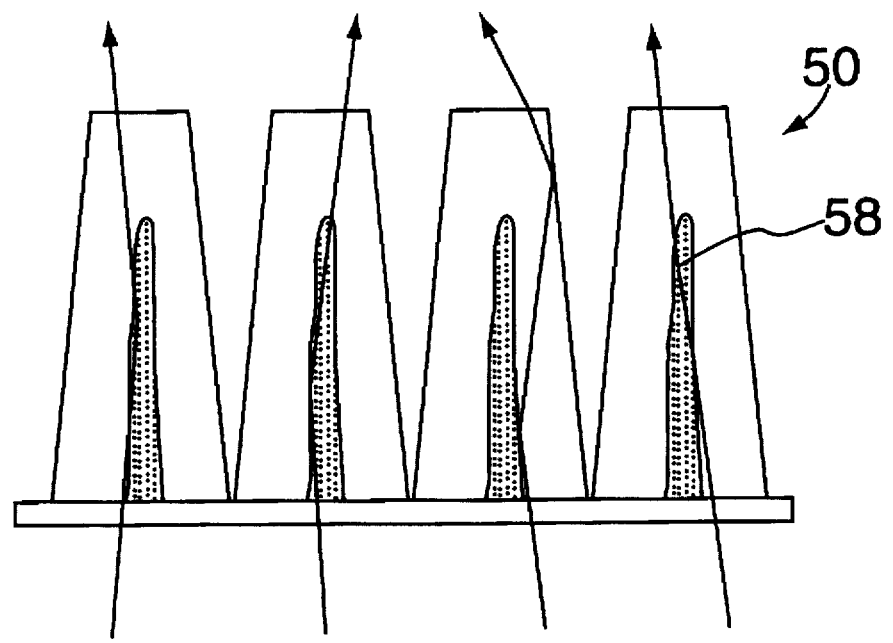
FIG. 18b illustrates light rays refracting through an array of waveguides of the present invention.

The second important improvement exhibited by an array of index inclusion tapered optical waveguides is the increased definition of the image (or focal) plane for the viewer of the viewing screen comprised of said array. It is highly desireable that the viewing screen of such a display be the image plane for the eye of the viewer. That is, the front of the display is where the viewer's eye focuses, rather than on elements internal to the display. When refractive index inclusions are not present in tapered optical waveguides, a certain portion of the light rays coming through the display do not undergo any reflections from the sidewalls of the waveguides. For that portion of the light, the eye may focus on an internal structure of the display, such as the backlight structure, resulting in undesirable nonuniformity in the viewed image. When the tapered optical waveguides contain refractive index inclusions, the number of rays which pass through without reflection or refraction are greatly reduced and these undesirable nonuniformities are reduced or eliminated. For this reason, an array of index inclusion tapered optical waveguides is superior in its ability to define the image plane of the display. The optical path of rays which otherwise would not reflect from the sidewalls of the tapered waveguides are shown in FIG. 18a. In FIG. 18a tapered waveguides 40 with no inclusions do not appreciably alter the path of light rays which do not contact a sidewall. In FIG. 18b the internal refractive index inclusions can refract or bend such rays. Note that some rays that would otherwise pass through the waveguide without contacting a sidewall are refracted such that they undergo such a sidewall reflection. Because the rays are refracted by the inclusion, a viewing screen comprised of index inclusion tapered optical waveguides will prevent the viewer's eye from focusing through the viewing screen to other elements internal to the display. Further, because the rays are refracted rather than scattered, the light is still transmitted efficiently through the viewing screen without the losses or deleterious backscatter of ambient light associated with adding large amounts of scattering.

EXAMPLES

Figure 1A:
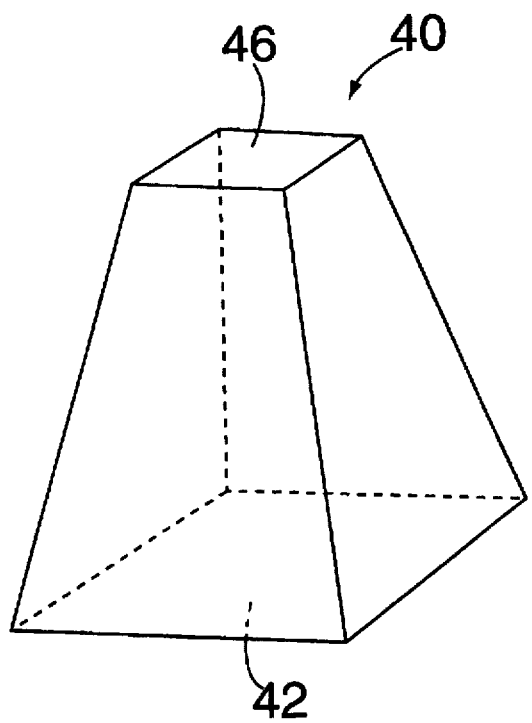
FIG. 1a is a tapered waveguide of the prior art.
Figure 1B:
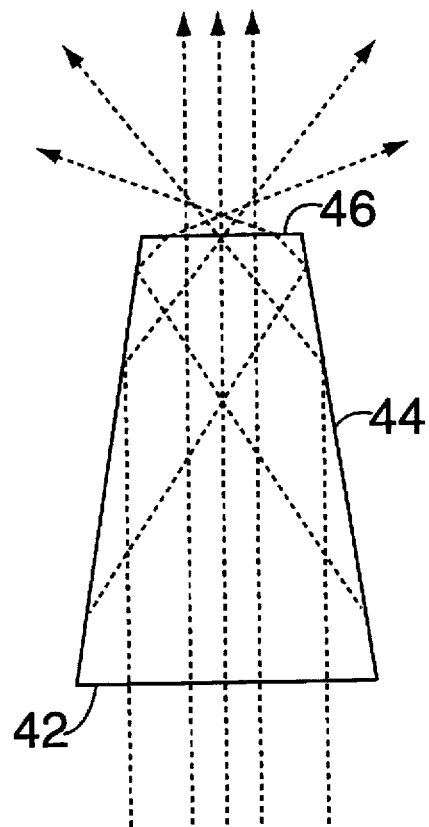
FIG. 1b is an elevation view of the embodiment of FIG. 1a illustrating light rays passing through the waveguide.
Figure 19:
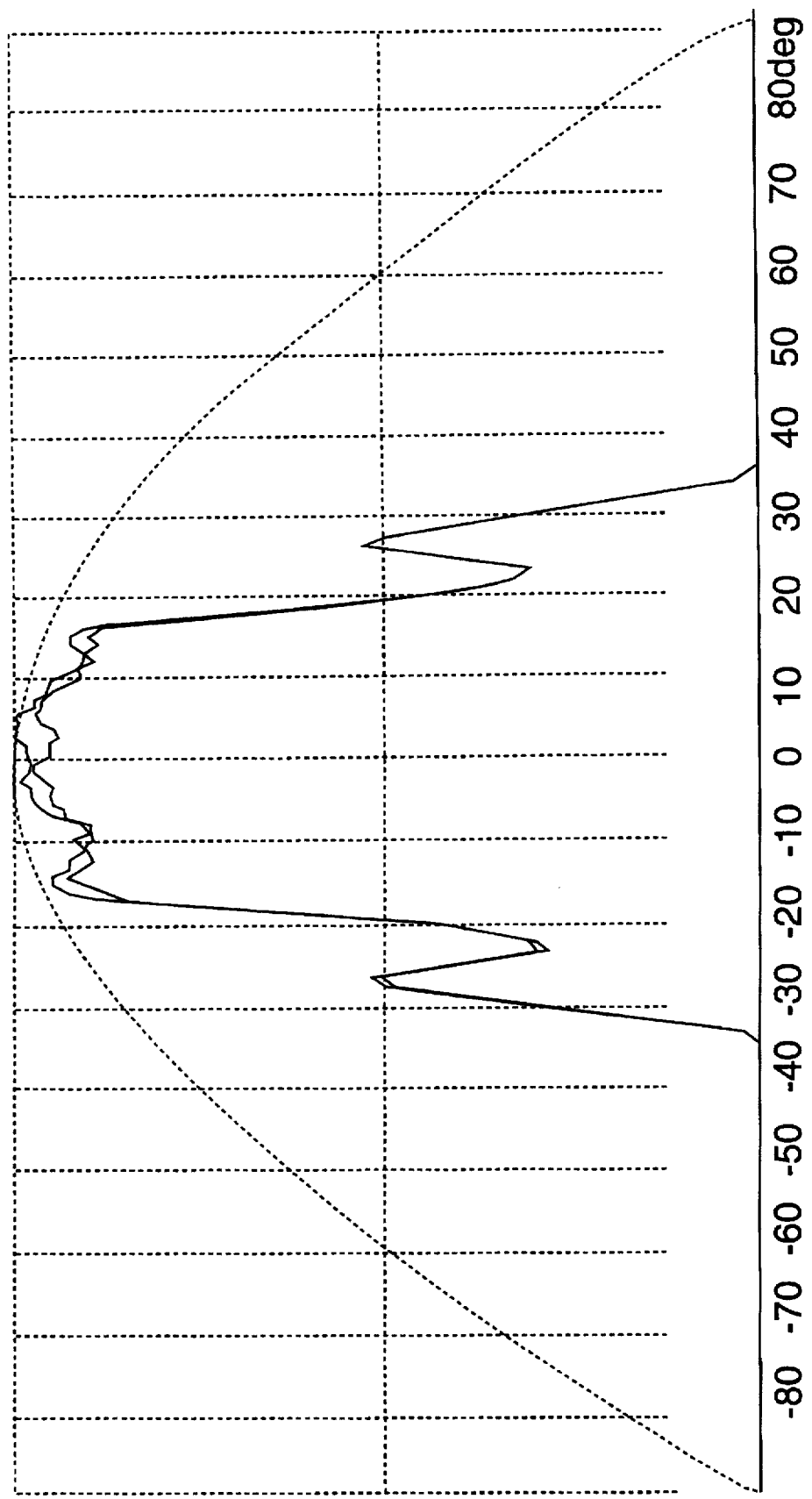
FIG. 19 is a light output distribution of a waveguide of the prior art.
Figure 20:
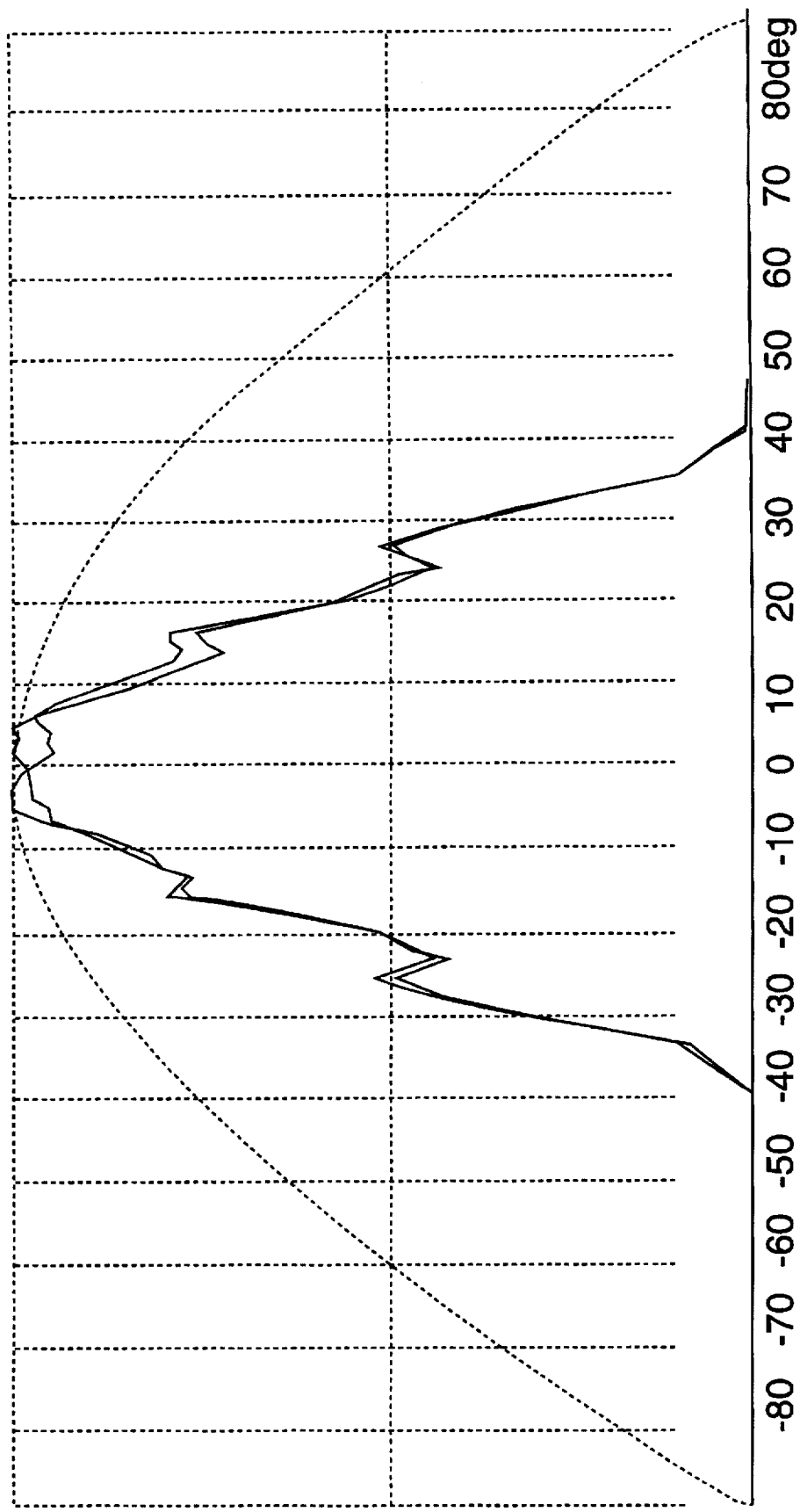
FIG. 20 is a light output distribution of a waveguide of the present invention having an inclusion with an index of refraction greater than the waveguide.
Figure 21:
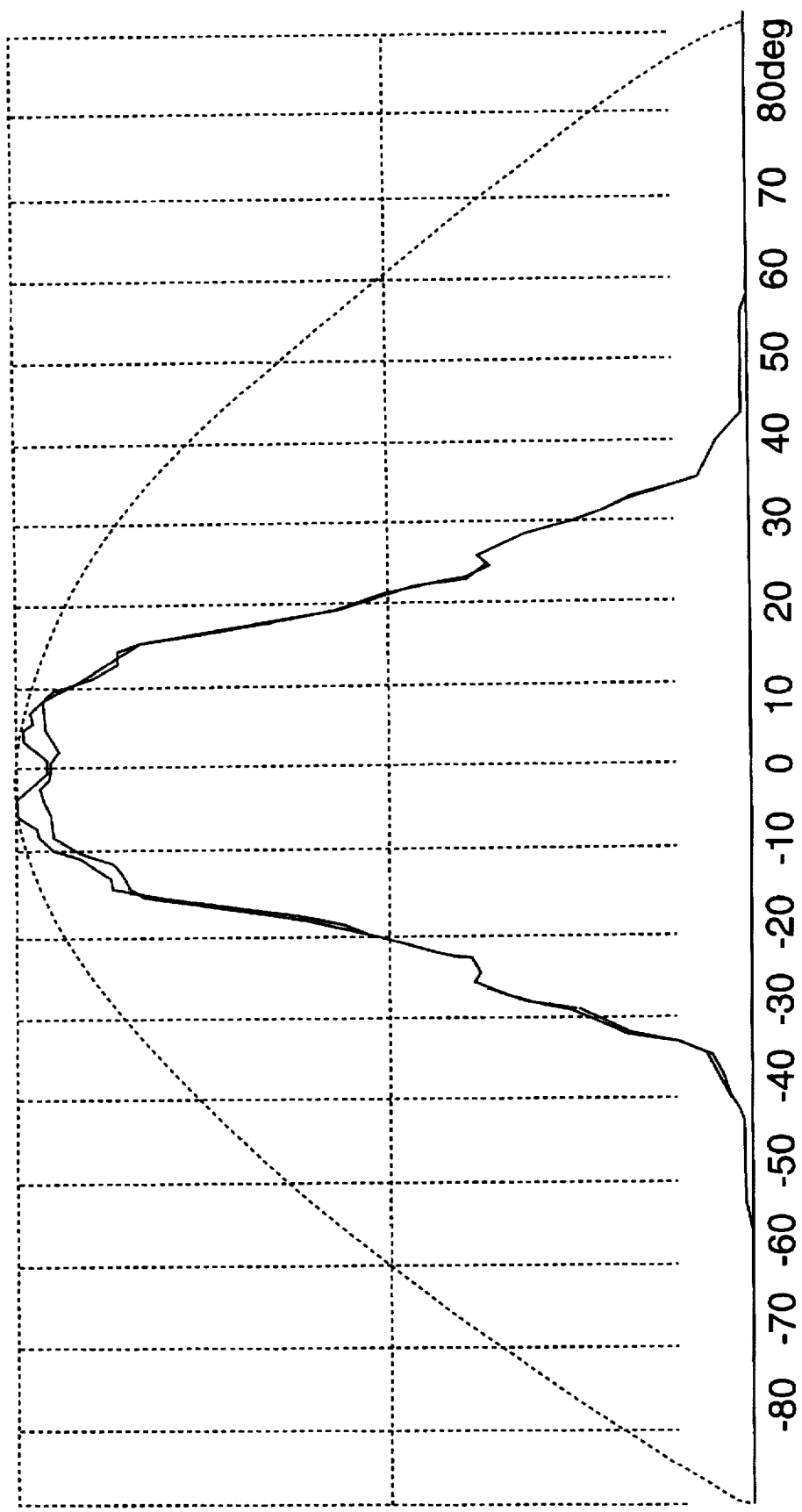
FIG. 21 is a light output distribution of a waveguide of the present invention having an inclusion with an index of refraction less than the waveguide.

The non-imaging optical properties of tapered waveguides can be modeled using a non-sequential ray tracing computer program. FIGS. 19–21 show the output distribution of a various tapered waveguides assuming an input of 100,000 light rays randomly distributed over the input surface of the waveguide and randomly distributed over input angles of −10 to +10 degrees. FIG. 19 illustrates the output distribution of the light rays for a tapered waveguide having no inclusions as illustrated in FIG. 1 and an index of refraction of 1.55. FIG. 20 illustrates the output distribution of the light rays for a tapered waveguide with an index of refraction of 1.55 similar to that illustrated in FIG. 16 and having an inclusion structure with an index of refraction of 1.58. FIG. 21 illustrates the output distribution of the light rays also for a tapered waveguide with an index of refraction of 1.55 similar to that illustrated in FIG. 16 and having an inclusion with an index of refraction of 1.53.

Figure 22:
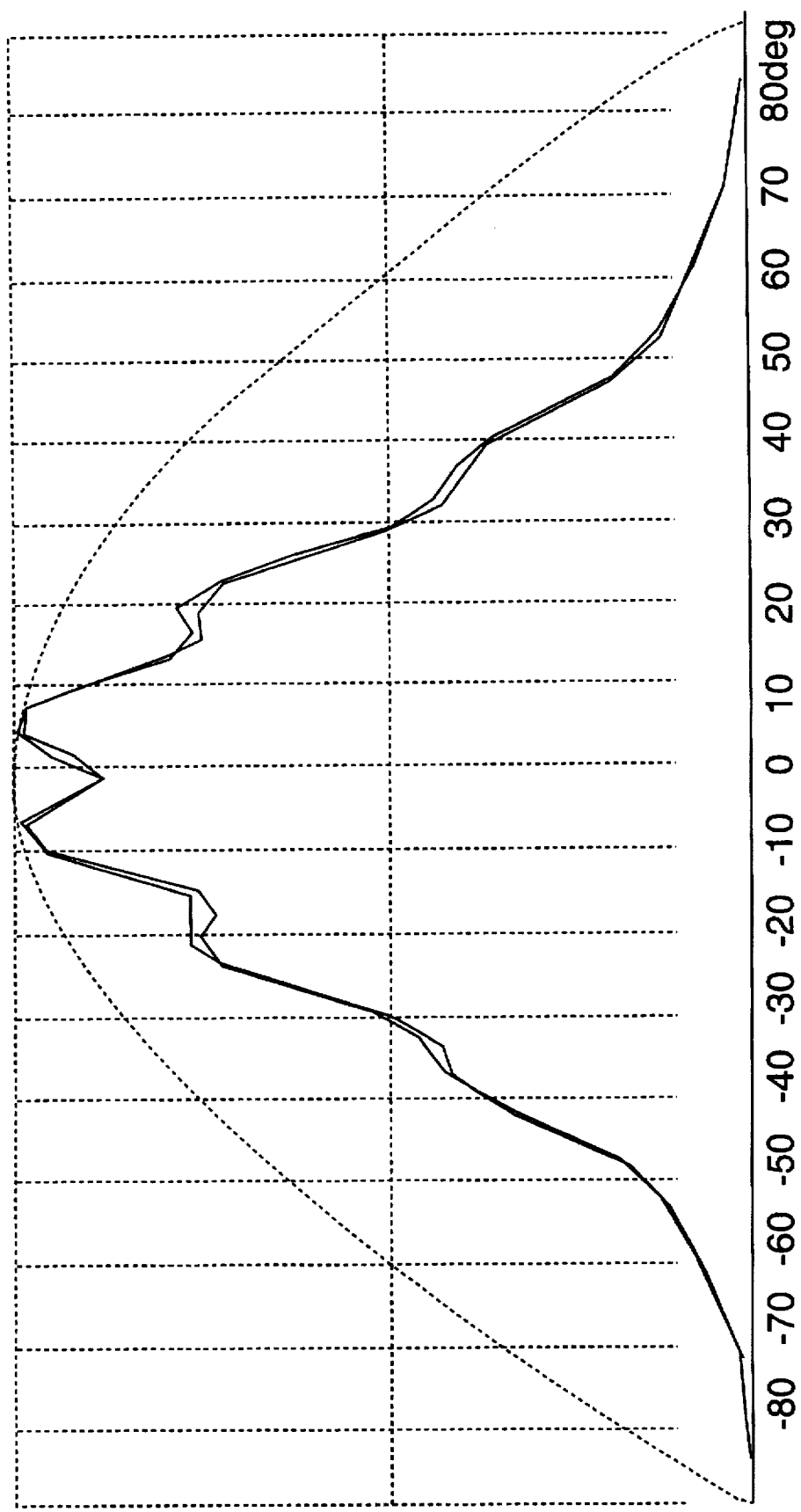
FIG. 22 is another example of a light output distribution of a waveguide of the prior art.
Figure 23:
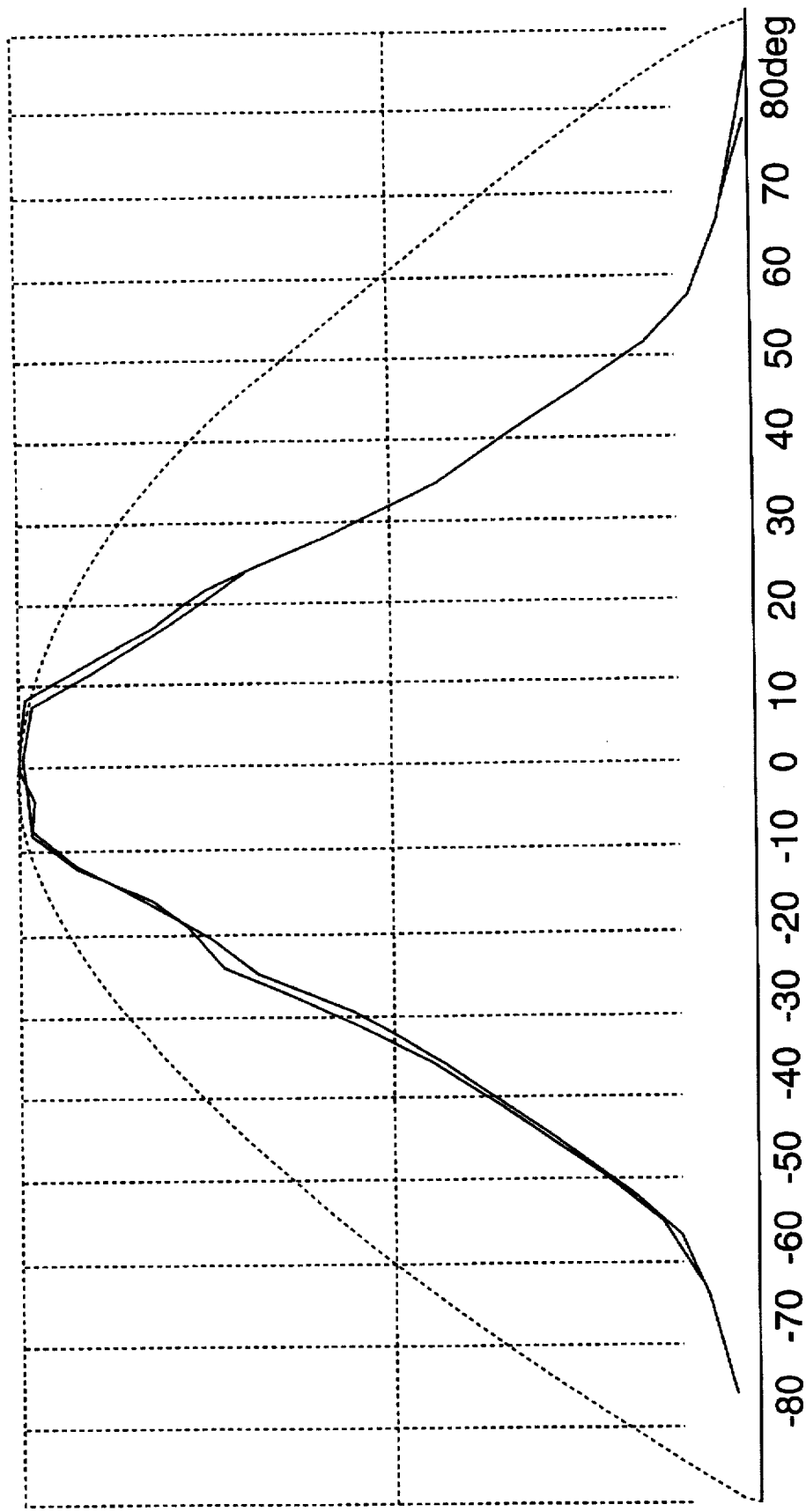
FIG. 23 is another light output distribution of a waveguide of the present invention having an inclusion with an index of refraction greater than the waveguide.
Figure 24:
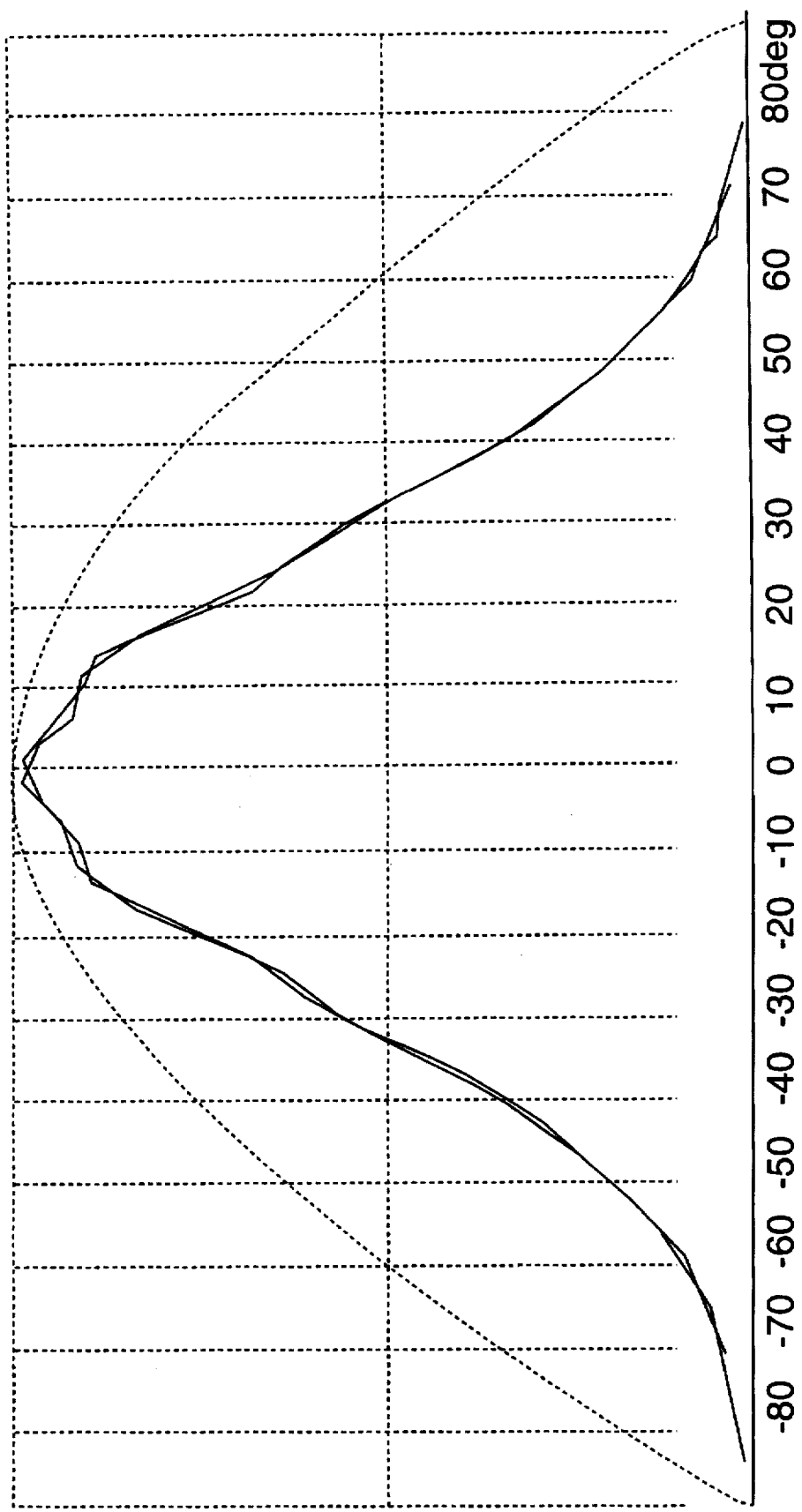
FIG. 24 is another light output distribution of a waveguide of the present invention having an inclusion with an index of refraction less than the waveguide.

FIGS. 22–24 show the output distribution of a various tapered waveguides assuming an input of 100,000 light rays randomly distributed over the input surface of the waveguide and randomly distributed over input angles of −20 to +20 degrees. FIG. 22 illustrates the output distribution of the light rays for a tapered waveguide having no inclusions as illustrated in FIG. 1 and an index of refraction of 1.55. FIG. 23 illustrates the output distribution of the light rays for a tapered waveguide with an index of refraction of 1.55 similar to that illustrated in FIG. 16 and having an inclusion with an index of refraction of 1.58. FIG. 24 illustrates the output distribution of the light rays also for a tapered waveguide with an index of refraction of 1.55 similar to that illustrated in FIG. 16 and an inclusion having an index of refraction of 1.53.

We claim:

1. An optical waveguide for transmitting light comprising a material having an index of refraction $n_1$ and surrounded by a medium having an index of refraction $n_0$ where $n_0<n_1$, and said optical waveguide further comprising:

a) an input surface for accepting a light distribution;

b) an output surface distal from said input surface and having a surface area less than the surface area of said input surface; and c) an inclusion comprising a material having an index of refraction $n_2$ and substantially surrounded by said material of index $n_1$ and where $n_1$ does not equal $n_2$, and further comprising a surface area in a common plane as said input surface;

whereby said inclusion acts to redirect light transmitting through said optical waveguide.

2. The optical waveguide of claim 1 wherein $n_1>n_2$.

3. The optical waveguide of claim 1 wherein $n_1<n_2$.

4. An array of optical waveguides of claim 1 wherein said optical waveguides are separated by interstitial regions having an index of refraction less than $n_1$.

5. The array of claim 1 wherein all or a portion of said interstitial regions contain an optically absorptive material.

6. The optical waveguide of claim 1 further comprising a plurality of inclusions.

7. The optical waveguide of claim 6 wherein at least one inclusion has a non-uniform refractive index.

8. The optical waveguide of claim 1 wherein said inclusion is continuous from said input surface to said output surface.

9. The optical waveguide of claim 1 where said optical waveguide is formed from organic polymeric material.

10. An optical waveguide for transmitting light comprising a material having an index of refraction $n_1$, and further comprising:

a) an input surface for accepting a light distribution;

b) an output surface distal from said input surface; and c) inclusion for redirecting light transmitting through said optical waveguide comprising a material having a non-uniform index of refraction and substantially surrounded by said material of index $n_1$;

wherein said optical waveguide is surrounded by a medium having an index of refraction $n_0$ where $n_0<n_1$ and the area of said input surface is greater than the area of said output surface so that the angular distribution of light emerging from said output surface is larger than the angular distribution of light entering said input surface.

11. An array of optical waveguides of claim 10 wherein said optical waveguides are separated by interstitial regions having an index of refraction less than $n_1$.

12. The array of claim 10 wherein all or a portion of said interstitial regions contain an optically absorptive material.

13. The optical waveguide of claim 10 further comprising a plurality of inclusions.

14. The optical waveguide of claim 10 wherein said inclusion is continuous from said input surface to said output surface.

15. The optical waveguide of claim 10 where said optical waveguide is formed from organic polymeric material.

16. The optical waveguide of claim 1 or 10 wherein the shape of said inclusion is selected from the group consisting of right circular cones, right oval cones, right square pyramids and right rectangular pyramids, which may be whole or truncated.

17. The optical waveguide of claim 1 or 10 wherein the cross-sectional shape is not constant along an axis joining said input surface and said output surface.

18. The optical waveguide of claim 17 wherein said cross-sectional shape of said input surface is a rectangle and said cross-sectional shape of said output surface is a polygon.

19. A process for manufacturing an optical waveguide having at least one inclusion comprising the steps of:

(a) placing a photomask in substantial contact with a substrate wherein said photomask comprising opaque regions defining a transparent region and said transparent region comprises at least one opaque region;

(b) placing a substantially uniform thickness of photopolymerizable mixture on said substrate so that said substrate is positioned between said photopolymerizable mixture and said photomask wherein;

(i) said photopolymerizable mixture comprises at least one reactive monomer and photoinitiator, and (ii) said photoinitiator is present in an amount sufficient to form a gradient of substantially collimated actinic radiation across the thickness of said photopolymerizable mixture during subsequent step (c);

(c) while maintaining said photopolymerizable mixture and substrate in a substantially fixed plane relative to said substantially collimated actinic radiation, exposing through said transparent regions of said photomask said photopolymerizable mixture to said substantially collimated actinic radiation for a time sufficient to form a tapered photopolymerized waveguide comprising at least one inclusion wherein:

(i) the tapered end of said waveguide extends outward from said substrate, and (ii) said waveguide has a light input surface adjacent said substrate and a light output surface distal from said light input surface, wherein the area of the light input surface of each of said waveguides is greater than the area of its light output surface (d) removing said photomask and photopolymerizable mixture which was not substantially polymerized by said substantially collimated actinic radiation during step (c) from said substrate.

20. The process of claim 19 wherein after step (b), a cover plate is placed on said substantially uniform thickness of photopolymerizable mixture.

21. The process of claim 19 which additionally comprises:

(e) applying light absorptive material to said tapered photopolymerized waveguide.

22. The process of claim 19 wherein said actinic radiation is ultraviolet light.

23. The process of claim 19 wherein said monomer is selected from the group consisting of methyl methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylol propane triacrylate, pentaerythritol triacrylate, pentaerythritol tetra-acrylate, and mixtures thereof.

24. The process of claim 19 wherein said monomer is a mixture of ethoxylated bisphenol A diacrylate and trimethylol propane triacrylate.

25. The process of claim 19 wherein said photoinitiator is selected from the group consisting of benzidimethyl ketal; α,α-diethyloxy acetophenone; α,α-dimethyloxy-α-hydroxy acetophenone; 50% 1-hydroxycyclohexyl phenyl ketone and 50% benzophenone; 1-hydroxy-cyclohexyl-phenyl ketone; 1-[4-(2-hydroxyethoxy)phenyl]-2-hydroxy-2-methyl-propan-1-one; 2-methyl-1-4(methylthio)phenyl]-2-morpholino-propan-1-one; and 2-benzyl-2-dimethylamino-1-(4-morpholinophenyl)butan-1-one.

26. The process of claim 19 wherein said photoinitiator is selected from the group consisting of benzidimethyl ketal; α,α-dimethyloxy-α-hydroxy acetophenone; 50% 1-hydroxycyclohexyl phenyl ketone and 50% benzophenone; 1-hydroxy-cyclohexyl-phenyl ketone; and 1-[4-(2-hydroxyethoxy)phenyl]-2-hydroxy-2-methyl-propan-1-one.

27. The process of claim 19 wherein said photoinitiator is present in an amount from about 0.5 to about 12 percent by weight based on the total weight of said photopolymerizable mixture.

28. The process of claim 19 wherein said photoinitiator is present in an amount from about 0.5 to about 8 percent by weight based on the total weight of said photopolymerizable mixture.

29. A process for manufacturing a tapered waveguide comprising the steps of;

(a) placing a substantially uniform thickness of photopolymerizable mixture on a photomask wherein:

(i) said photomask comprising opaque regions defining a transparent region and said transparent region comprises at least one opaque region, (ii) said photopolymerizable mixture comprises at least one reactive monomer and photoinitiator, and (iii) said photoinitiator is present in an amount sufficient to form a gradient of substantially collimated actinic radiation across the thickness of said photopolymerizable mixture during subsequent step (b);

(b) while maintaining said photopolymerizable mixture and photomask in a substantially fixed plane relative to said substantially collimated actinic radiation, exposing through said transparent regions of said photomask said photopolymerizable mixture to said substantially collimated actinic radiation for a time sufficient to form a tapered photopolymerized waveguides comprising at least one inclusion wherein:

(i) the tapered end of said waveguide extends outward from said photomask, (ii) said waveguides has a light input surface adjacent said photomask and a light output surface distal from said light input surface, and (iii) the area of the light input surface of said waveguides is greater than the area of its light output surface; and (c) removing photopolymerizable mixture which was not substantially polymerized by said substantially collimated actinic radiation during step (b) from said photomask.

30. The process of claim 29 wherein after step (a), a cover plate is placed on said substantially uniform thickness of photopolymerizable mixture.

31. The process of claim 29 which additionally comprises:

(d) applying light absorptive material to said tapered photopolymerized waveguide.

32. The process of claim 29 wherein said actinic radiation is ultraviolet light.

33. The process of claim 29 wherein said monomer is selected from the group consisting of methyl methacrylate, n-butyl acrylate, 2-ethylhexyl acrylate, isodecyl acrylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, trimethylol propane triacrylate, pentaerythritol triacrylate, pentaerythritol tetra-acrylate, and mixtures thereof.

34. The process of claim 29 wherein said monomer is a mixture of ethoxylated bisphenol A diacrylate and trimethylol propane triacrylate.

35. The process of claim 29 wherein said photoinitiator is selected from the group consisting of benzidimethyl ketal; α,α-diethyloxy acetophenone; α,α-dimethyloxy-α-hydroxy acetophenone; 50% 1-hydroxycyclohexyl phenyl ketone and 50% benzophenone; 1-hydroxy-cyclohexyl-phenyl ketone; 1-[4-(2-hydroxyethoxy)phenyl]-2-hydroxy-2-methyl-propan-1-one; 2-methyl-1-4-(methylthio)phenyl]-2-morpholino-propan-1-one; and 2-benzyl-2-dimethylamino-1-(4-morpholinophenyl)butan-1-one.

36. The process of claim 29 wherein said photoinitiator is selected from the group consisting of benzidimethyl ketal; α,α-dimethyloxy-α-hydroxy acetophenone; 50% 1-hydroxycyclohexyl phenyl ketone and 50% benzophenone; 1-hydroxy-cyclohexyl-phenyl ketone; and 1-[4-(2-hydroxyethoxy)phenyl]-2-hydroxy-2-methyl-propan-1-one.

37. The process of claim 29 wherein said photoinitiator is present in an amount from about 0.5 to about 12 percent by weight based on the total weight of said photopolymerizable mixture.

38. The process of claim 29 wherein said photoinitiator is present in an amount from about 0.5 to about 8 percent by weight based on the total weight of said photopolymerizable mixture.

39. An optical waveguide of claim 1 wherein said inclusion is not continuous from said input surface to said output surface.

40. An optical waveguide of claim 10 wherein said inclusion is not continuous from said input surface to said output surface.

41. An optical waveguide of claim 1 wherein the volume of said inclusion is at least one-half the volume of said optical waveguide.

42. An optical waveguide of claim 1 wherein said input surface and said output surface define a height H, and the height of said inclusion is at least ½H.

43. An optical waveguide of claim 10 wherein the volume of said inclusion is at least one-half the volume of said optical waveguide.

44. An optical waveguide of claim 10 wherein said input surface and said output surface define a height H, and the height of said inclusion is at least ½H.

* * * * *